(12) United States Patent
Zhu

(10) Patent No.: US 12,416,788 B1
(45) Date of Patent: Sep. 16, 2025

(54) SYSTEMS AND METHODS FOR PERFORMING MULTI-ZONE OPTICAL DETECTION

(71) Applicant: Yuanji Zhu, Luoyang (CN)

(72) Inventor: Yuanji Zhu, Luoyang (CN)

( * ) Notice: Subject to any disclaimer, the term of this patent is extended or adjusted under 35 U.S.C. 154(b) by 0 days.

(21) Appl. No.: 19/038,075

(22) Filed: Jan. 27, 2025

Related U.S. Application Data

(60) Provisional application No. 63/697,486, filed on Sep. 21, 2024.

(51) Int. Cl.
*G02B 13/00* (2006.01)
*G02B 3/00* (2006.01)

(52) U.S. Cl.
CPC ....... *G02B 13/0015* (2013.01); *G02B 3/0062* (2013.01)

(58) Field of Classification Search
CPC .............. G02B 13/0015; G02B 3/0062; G02B 6/0026; G03B 17/02; G06F 1/1626; H05B 47/13
See application file for complete search history.

(56) References Cited

U.S. PATENT DOCUMENTS

| | | | |
|---|---|---|---|
| 11,032,892 B2 * | 6/2021 | Xie | H05B 47/13 |
| 2015/0123547 A1 * | 5/2015 | Fushimi | F21V 23/0471 |
| | | | 315/158 |
| 2020/0094108 A1 * | 3/2020 | Slinkard | G01P 1/026 |
| 2022/0035200 A1 * | 2/2022 | Chen | G06F 1/1626 |
| 2023/0096622 A1 * | 3/2023 | Kim | G06V 10/143 |
| | | | 600/476 |

\* cited by examiner

*Primary Examiner* — Hung H Lam
(74) *Attorney, Agent, or Firm* — Clayton, McKay & Bailey, PC

(57) ABSTRACT

Described herein are examples of systems and methods for performing multi-zone optical detection. In an example, a multi-zone optical detection system can cover multiple detecting zones, solving problems such as detecting motion/force/speed of an air click. In another example, a group of multi-zone optical detection systems can comprise multiple multi-zone optical detection systems. In use, multiple groups of multi-zone optical detection systems can be positioned at different locations.

17 Claims, 31 Drawing Sheets

SYSTEMS AND METHODS FOR PERFORMING MULTI-ZONE OPTICAL DETECTION

CROSS REFERENCE TO RELATED APPLICATIONS

This application claims priority to U.S. Provisional Patent Application No. 63/697,486, filed Sep. 21, 2024, which is incorporated herein by reference as if set forth herein in its entirety.

BACKGROUND

In public facilities, the transmission of bacteria and viruses through contact with control buttons, knob or dial contact, keyboard buttons, and/or other input devices (collectively referred to herein as "control buttons") pose significant concerns for public health. Studies have shown that control buttons can harbor a variety of pathogens, including bacteria such as *Staphylococcus aureus, Escherichia coli*, and viruses like influenza and rhinovirus. Such viruses and bacteria can survive on surfaces like control buttons for varying amounts of time, depending on factors such as temperature, humidity, and the specific microorganism involved.

When individuals touch these surfaces, they can easily transfer these pathogens to their hands. Subsequent contact with the face, mouth, or eyes can lead to the introduction of these pathogens into the body, increasing the risk of infection. Furthermore, individuals can inadvertently spread these pathogens to other surfaces and individuals with which they come into contact.

To minimize the risk of infection from touching control buttons or other commonly touched surfaces, medical professionals stress the importance of practicing good hand hygiene. This can include washing one's hands frequently with soap and water for at least twenty seconds, especially after touching potentially contaminated surfaces, and using hand sanitizer containing at least 60% alcohol when soap and water are not readily available. Additionally, medical professionals recommend avoiding touching one's face, especially one's eyes, nose, and mouth, to help reduce the risk of transferring infectious agents from one's hands to one's mucous membranes.

However, it is not always practical to ask individuals to wash their hands as frequently as may be required to avoid any instance of a pathogen being transferred from buttons of a control panel or other commonly touched surface to an individual's hand and then to the individual's mucous membranes. For example, there may be limited access to washing stations and/or the navigation of a facility may require contact with a large number of control buttons and similar surfaces.

Furthermore, there may be a safety concern during button operating, such as stuck finger or electricity shock. Additionally, buttons under frequent use may need regular maintenance.

Given the high traffic and frequent use of control buttons and input keyboards in daily life, the risk of operating safety, maintenance work, and bacterial and viral transmission through these surfaces is heightened. As a result, a need exists for improved systems and methods for avoiding the transmission of pathogens in high traffic locations.

Current technology utilizes non-contact buttons or sensors to detect an approach activity, lacking a technique to solve conflict triggers when multiple non-contact buttons or sensors needs to be implemented as a group. For example, multiple non-contact buttons, controlling electronics in a room, need to keep a large distance between each other, in order to avoid false triggers when an individual intends to activate one non-contact button and not another. Therefore, a strong need exists for improved systems and methods for detecting multi-zone movement in such locations.

SUMMARY

The present disclosure describes novel, non-contact systems and methods for managing multi-zone optical detection. Applying the systems and methods described herein to any suitable devices in public facilities, industrial facilities, or private facilities, as examples, can greatly reduce the risk of bacterial and/or viral transmission through contact.

In one aspect, the systems described here can detect a movement, and/or other postures. For example, the systems can analyze a pattern or series of movements. In a further aspect, the systems can translate the movements into numbers, symbols, or commands. In another aspect, the systems can send signals to, or otherwise control, output interfaces or other devices, such as open/close commands to relays, and connect/disconnect commands of a 24 V DC power to remote devices. In a further illustrative example, the systems can send signals to, or otherwise control, other devices such as valves, faucets, lights, sounds, motors, or thermostats which would otherwise require contact.

In another aspect, the systems can detect the speed of a movement and/or the acceleration of the movement. For example, the systems can record a triggering time of each detection zone and calculate the speed of a movement. In another example, the system can detect a movement acceleration. In a further example, the system can output signals based on different combinations of an acceleration value and a movement velocity, such as an acceleration value of 5 g-20 g after triggering two detection zones can send a signal representing a double-click movement.

In a further aspect, the systems can detect movement with one detection zone covering 200 mm away, and another detection zone covering 50 mm away. In other examples, the systems can detect movement from shorter or greater distances.

In one embodiment, the systems can be arranged in arrays working as a group. For example, a group of twelve multi-zone optical detection systems can be arranged in three rows and four columns, forming a non-contact keyboard, outputting signals or commands upon respective password/symbol sequences.

In further embodiments, multiple groups of the systems can be located at different places. In some examples, a device can be controlled by multiple groups of the systems simultaneously. In other examples, the groups of the systems controlling the device can have different priorities such that commands received at one or more groups are given priority and/or can override commands received at one or more other groups.

In other examples, the systems can support the recording of customized movements. For example, the systems can record an individual performing a particular movement or sequential symbol input, and save associated information for later detection and use by the user.

In another example, the systems can record a pattern associated with an individual's movement. In some embodiments, the systems can record a password input pattern associated with an individual's finger movement. In a further illustrative example, the systems can compare a saved recording of a prior movement with a subsequent detection of a future movement. Where the subsequently detected movement substantially matches the recorded movement, a customized reaction (e.g., closing a relay output) can be performed.

Both the foregoing general description and the following detailed description are exemplary and explanatory only and are not restrictive of the examples, as claimed.

BRIEF DESCRIPTION OF THE DRAWINGS

The accompanying drawings, which are incorporated in and constitute a part of this disclosure, illustrate various embodiments and aspects of the present disclosure. In the drawings.

DESCRIPTION OF THE EXAMPLES

Reference will now be made in detail to the present examples, including examples illustrated in the accompanying drawings. Wherever possible, the same reference numbers will be used throughout the drawings to refer to the same or like parts. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this disclosure belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

It should be understood that a number of techniques and steps are disclosed. Each of these techniques and steps has individual benefits and each can also be used in conjunction with one or more, or in some cases all, of the other disclosed techniques and steps. Accordingly, for the sake of clarity, this description will refrain from repeating every possible combination of the individual steps in an unnecessary fashion. Nevertheless, the specification and claims should be read with the understanding that such combinations are entirely within the scope of the disclosure and the claims.

The present disclosure is to be considered as an exemplification of the systems and methods described here and is not intended to limit the systems and methods to the specific embodiments illustrated by the figures or described below.

Figure 1:
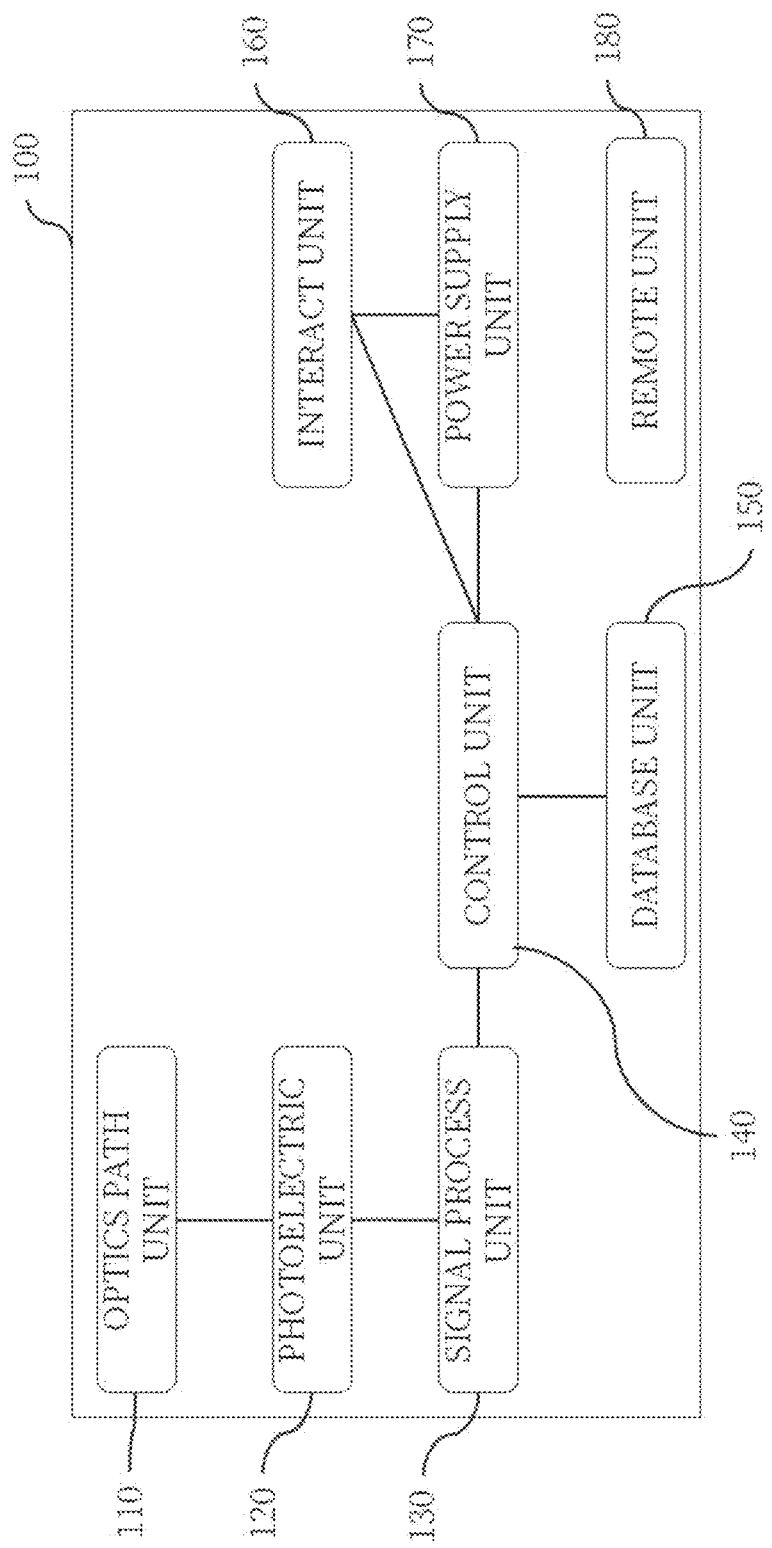
FIG. 1 is an illustration of example hardware components comprising a multi-zone optical detection management system in accordance with this disclosure.

FIG. 1 depicts a diagram of an illustrative multi-zone optical detection management system. In one embodiment, an optics path unit 110 can modify optical transmission. Photoelectric unit 120 can transmit and receive light of multiple wavelengths. Signal processing unit 130 can process optical signals between photoelectric unit 120 and control unit 140. Control unit 140 can exchange information and/or send signals to signal processing unit 130, database unit 150, interact unit 160, remote unit 180, and other systems. Database unit 150 can store and manage data. Interact unit 160 can be used to interact with a user. Power supply unit 170 can provide power to the system. Remote unit 180 can communicate with control unit 140 and control other devices remotely.

Figure 2:
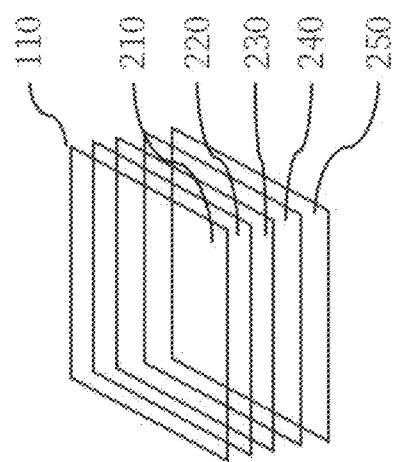
FIG. 2 is an illustration of example hardware components comprising an optics path unit in accordance with this disclosure.

FIG. 2 depicts a diagram of an illustrative optics path unit 110. In one embodiment, optics path unit 110 can comprise a top layer 210, a filter layer 220, a composite layer 230, a gap layer 240, and a bottom layer 250. In some examples, gap layer 240 can be arranged between any two layers and optics path unit 110 can comprise multiple gap layers 240.

Figure 3:
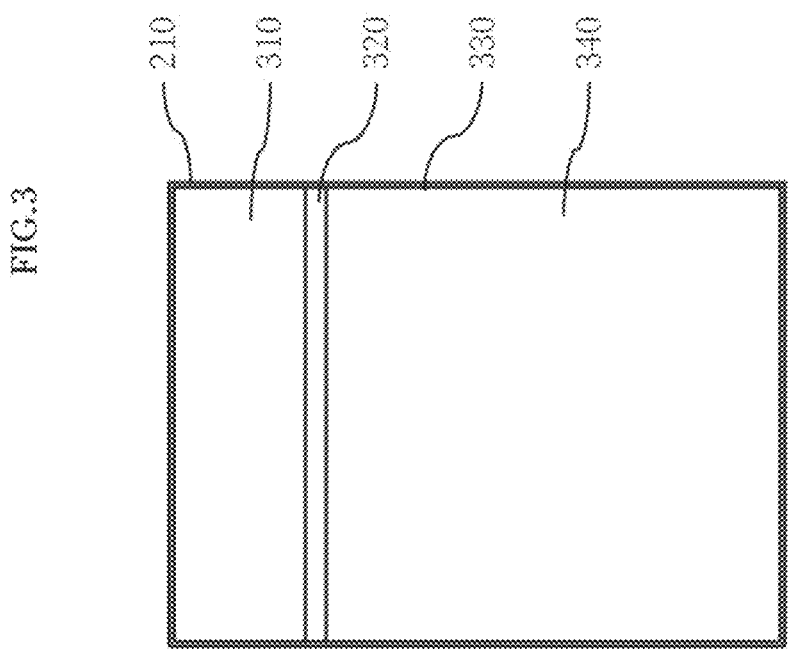
FIG. 3 is an illustration of example hardware components comprising a top layer in an optics path unit in accordance with this disclosure.

FIG. 3 depicts a diagram of an illustrative top layer 210. In one embodiment, a top layer 210 can comprise a display area 310, an auxiliary area 320, a main area 330, and a film 340. In some examples, display area 310 can be coupled to one or more components of interact unit 160, such as a display device 1520. Auxiliary area 320 can, in some embodiments, be coupled to one or more components of interact unit 160, such as adjustment device 1510. In some embodiments, main area 330 can comprise any suitable structure and material designed for any reasonable purpose, such as a curved S-shape porous plastic structure for improving dynamic impact energy dissipation. In further embodiments, film 340 can comprise any suitable structure and material designed for any suitable purpose, such as waterproof and dustproof composite nanomaterials for ensuring a clean-free surface.

Figure 4:
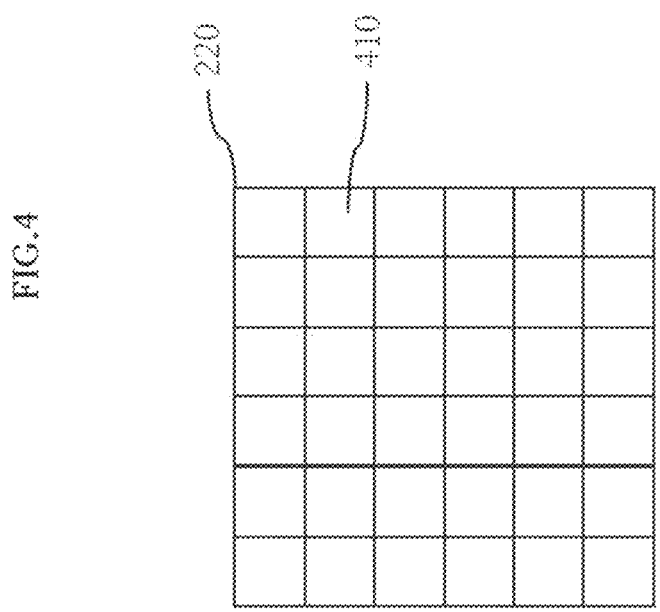
FIG. 4 is an illustration of example hardware components comprising a filter layer in an optics path unit in accordance with this disclosure.

FIG. 4 depicts a diagram of an illustrative filter layer 220. In one embodiment, a filter layer 220 can comprise an array of filter lenses 410 of different wavelengths. In some examples, filter lens 410 can comprise any suitable structure and material, such as PMMA. Each filter lens 410 can, in some embodiments, have different physical properties, such as cutoff wavelength and refractive index.

Figure 5:
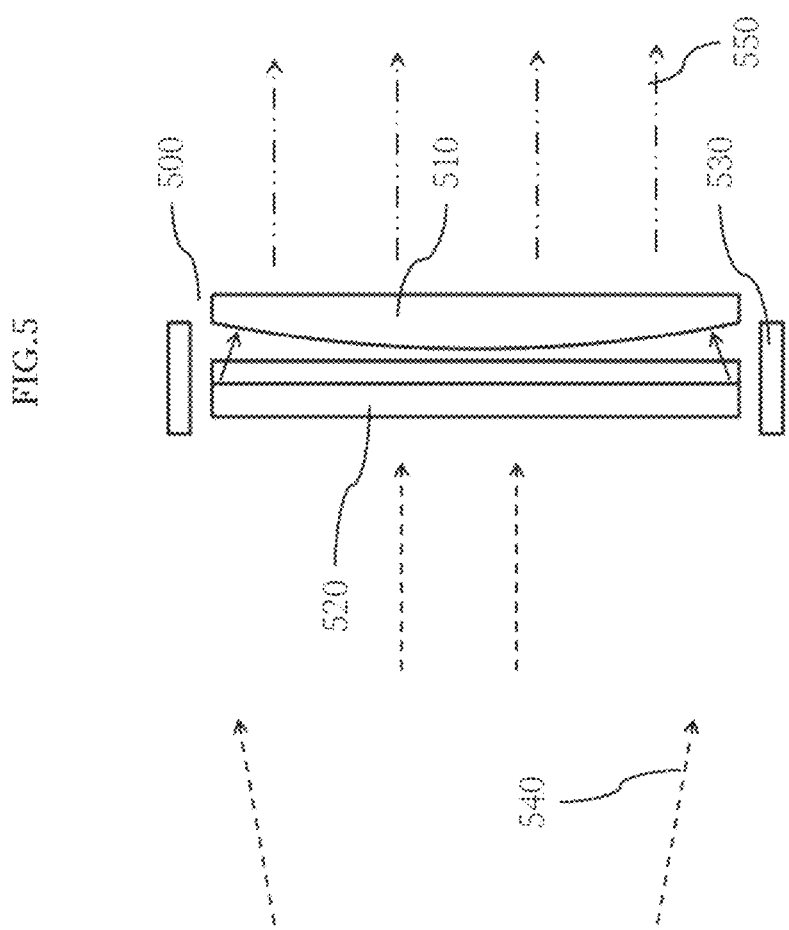
FIG. 5 is an illustration of example hardware components comprising a composite layer in an optics path unit in accordance with this disclosure.

FIG. 5 depicts a diagram of an illustrative composite lens 500. In one embodiment, a composite layer 230 can comprise an array of composite lenses 500. Each composite lens 500 can, in some embodiments, have different structures according to different light propagation requirements. In some embodiments, composite lens 500 can comprise one or more lenses 510, one or more composite bodies 520, and one or more mirrors 530. In further embodiments, composite lens 500 can change light path 540 to light path 550. In another aspect, each lens 510 can have different physical properties, such as shape, dielectric constant, and magnetic permeability. Each composite body 520 can comprise different composite materials arranged in a periodic combination of microstructures, in some examples. In other embodiments, mirrors 530 can comprise mirrors of different shape and reflectivity.

Figure 6:
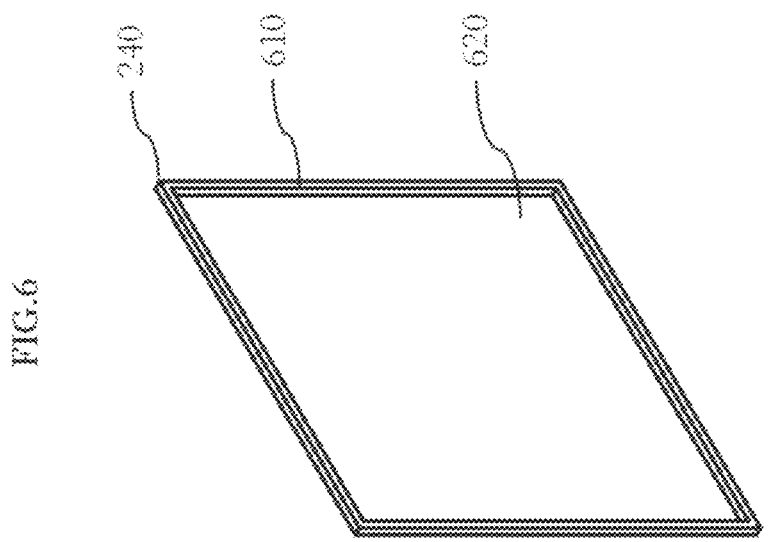
FIG. 6 is an illustration of example hardware components comprising a gap layer in an optics path unit in accordance with this disclosure.

FIG. 6 depicts a diagram of an illustrative gap layer 240. In one embodiment, gap layer 240 can comprise a spacer 610 and a filling 620. In some examples, spacer 610 can comprise any suitable structure and material, such as a vacuum honeycomb structure. Filling 620 can, in some embodiments, comprise any suitable material, such as argon.

Figure 7:
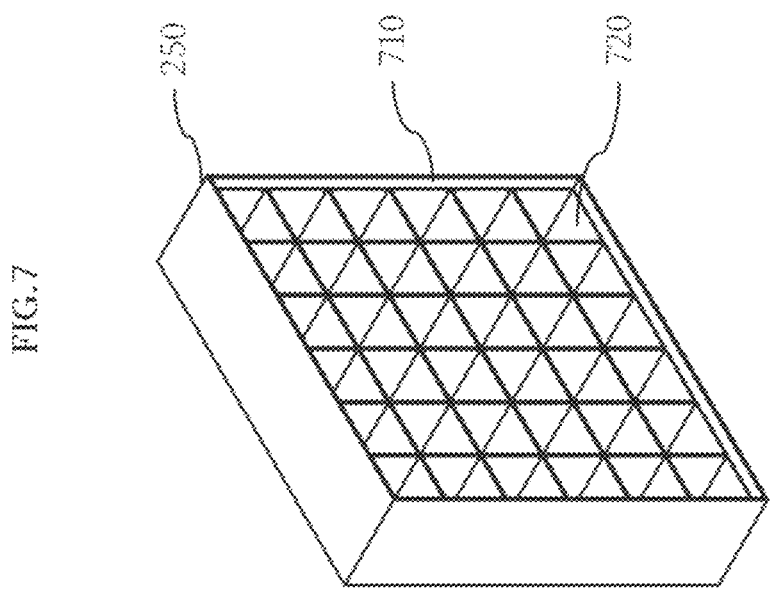
FIG. 7 is an illustration of example hardware components comprising a bottom layer in an optics path unit in accordance with this disclosure.

FIG. 7 depicts a diagram of an illustrative bottom layer 250. In one embodiment, bottom layer 250 can comprise a main structure 710 and a separator 720. In some examples, main structure 710 can comprise any suitable structure and material, such as aluminum alloy. Separator 720 can, in some embodiments, connect transmit device 800 and receiver device 1000. In some embodiments, separator 720 can isolate each transmitter 900 of transmit device 800, and each receiver 1100 of receiver device 1000.

Figure 8:
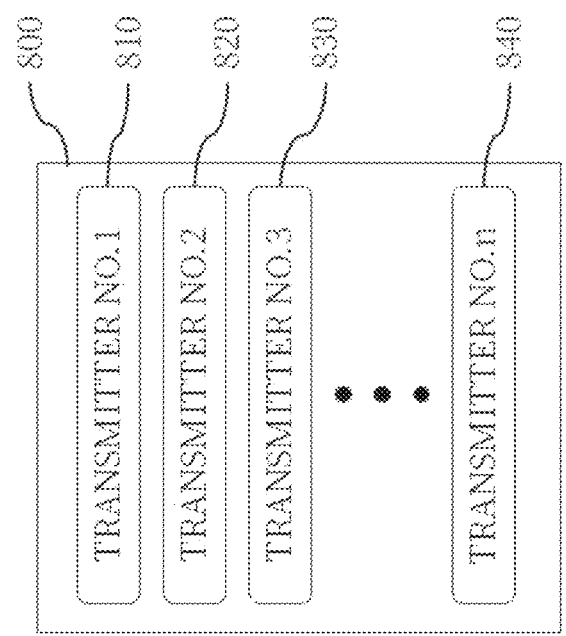
FIG. 8 is an illustration of example hardware components comprising a transmit device in a photoelectric unit in accordance with this disclosure.

FIG. 8 depicts a diagram of an illustrative transmit device 800. In one embodiment, transmit device 800 can comprise a transmitter No. 1 810, a transmitter No. 2 820, a transmitter No. 3 830, and so on, up to a transmitter No. n 840. In some examples, some transmitters can transmit light of a same wavelength and some transmitters can transmit light of different wavelengths. Transmit device 800 can, in some embodiments, comprise seven transmitters. In such embodiments, for example, transmitter No. 1 and transmitter No. 2 can transmit light of 850 nm wavelength, transmitter No. 3 and transmitter No. 4 can transmit light of 880 nm wavelength, transmitter No. 5 and transmitter No. 6 may transmit light of 940 nm wavelength, and transmitter No. 7 can transmit light of 560 nm wavelength.

Figure 9:
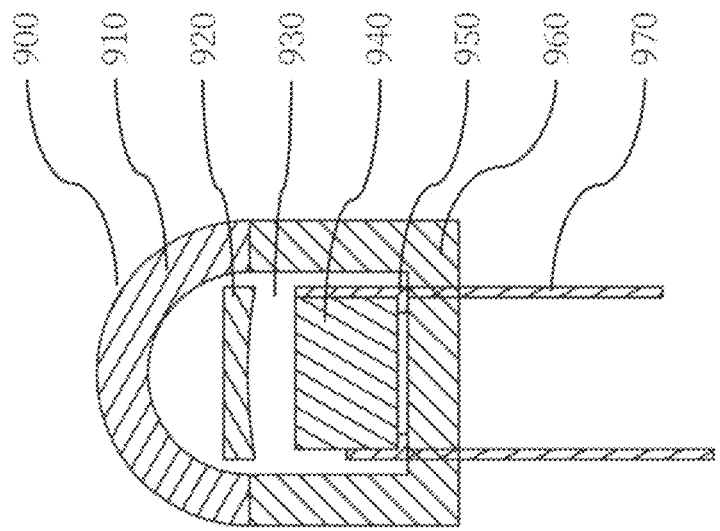
FIG. 9 is an illustration of example hardware components comprising a transmitter in a transmit device in accordance with this disclosure.

FIG. 9 depicts a diagram of an illustrative transmitter 900. In one embodiment, transmitter 900 can comprise a top encapsulation 910, a lens 920, a filling 930, a core 940, a fixing 950, a bottom encapsulation 960, and a connector 970. In some examples, top encapsulation 910 can comprise any suitable material, such as a transparent resin material. Lens 920 can, in some embodiments, comprise any suitable material, such as organic glass material for guiding and improving light emitting efficiency. In some embodiments, filling 930 can comprise any suitable material, such as argon. In further embodiments, core 940 can comprise any suitable material, such as gallium arsenide. In another aspect, fixing 950 can fix lens 920, core 940, and connector 970 to bottom encapsulation 960. Bottom encapsulation 960 can comprise any suitable material, such as opaque black resin, in some examples. In other embodiments, connector 970 can include any suitable number of pins made of any suitable material, such as 3 pins made of copper-plated gold material.

Figure 10:
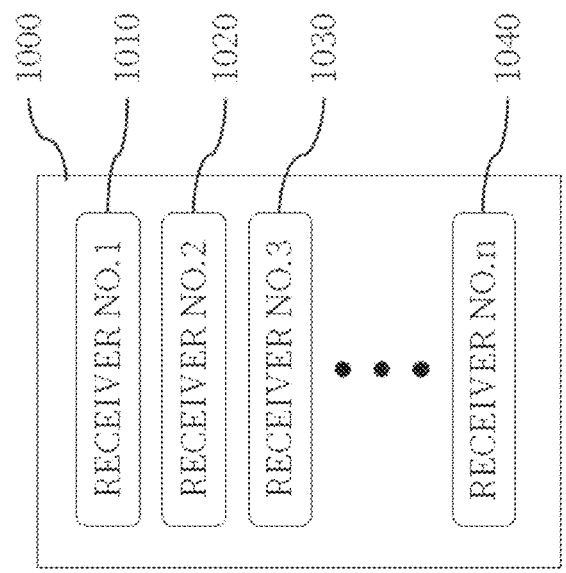
FIG. 10 is an illustration of example hardware components comprising a receiver device in a photoelectric unit in accordance with this disclosure.

FIG. 10 depicts a diagram of an illustrative receiver device 1000. In one embodiment, receiver device 1000 can comprise a receiver No. 1 1010, a receiver No. 2 1020, a receiver No. 3 1030, and so on, up to a receiver No. n 1040. In some examples, some receivers can receive light of a same wavelength and some receivers can receive light of different wavelengths. Receiver device 1000 can, in some embodiments, comprise four receivers. In such embodiments, for example, receiver No. 1 and receiver No. 2 can receive light of 760 nm-1100 nm wavelength, and receiver No. 3 and receiver No. 4 can receive light of 840 nm-1100 nm wavelength.

Figure 11:
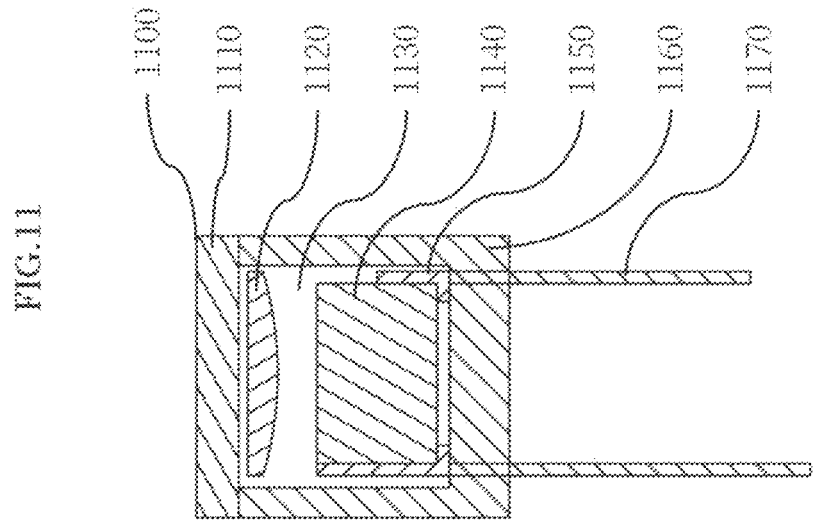
FIG. 11 is an illustration of example hardware components comprising a receiver in a receiver device in accordance with this disclosure.

FIG. 11 depicts a diagram of an illustrative receiver 1100. In one embodiment, receiver 1100 can comprise a top encapsulation 1110, a lens 1120, a filling 1130, a core 1140, a fixing 1150, a bottom encapsulation 1160, and a connector 1170. In some examples, top encapsulation 1110 can comprise any suitable material, such as a transparent resin material. Lens 1120 can, in some embodiments, comprise any suitable material, such as an organic glass material for guiding and improving light emitting efficiency. In some embodiments, filling 1130 can comprise any suitable material, such as argon. In further embodiments, core 1140 can comprise any suitable material, such as gallium phosphide. In another aspect, fixing 1150 can fix lens 1120, core 1140, and connector 1170 to bottom encapsulation 1160. Bottom encapsulation 1160 can comprise any suitable material, such as opaque black resin, in some examples. In other embodiments, connector 1170 can include any suitable number of pins made of any suitable material, such as two pins made of copper-plated gold material.

Figure 12:
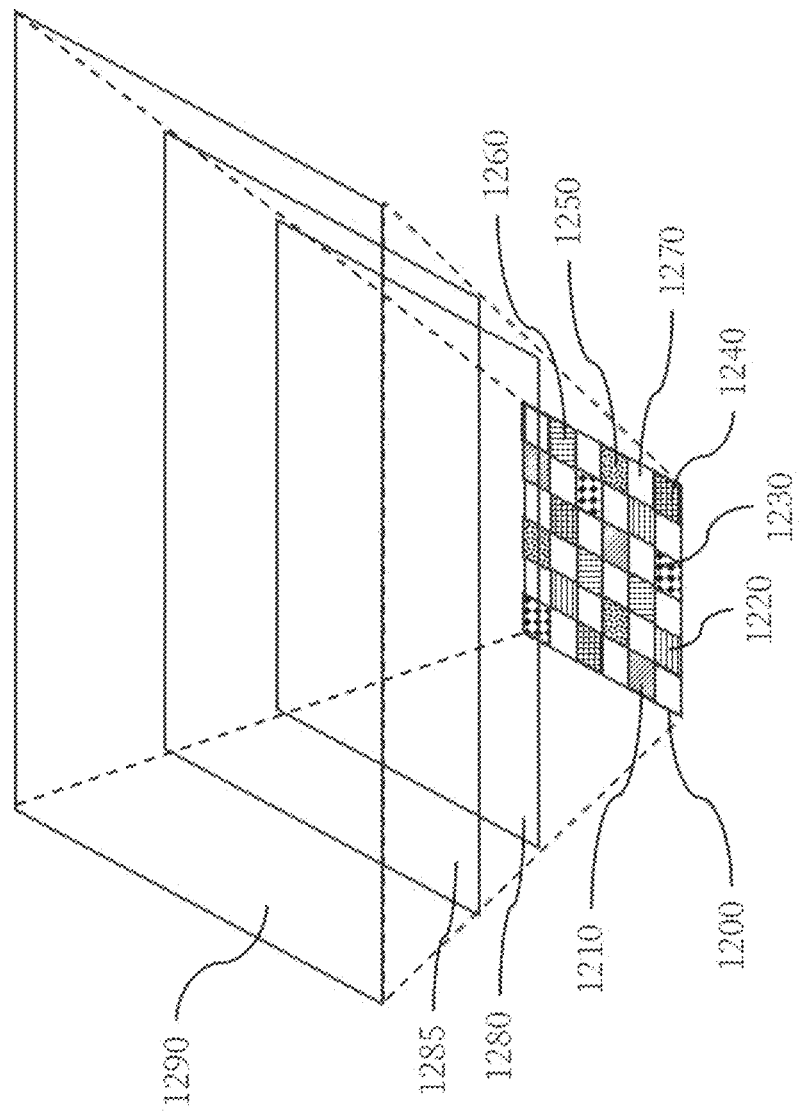
FIG. 12 is an illustration of example components of a multi-zone optical detection system in accordance with this disclosure.

FIG. 12 depicts illustrative components for a multi-zone optical detection system 1200, a detection zone 1280, a detection zone 1285, and a detection zone 1290. In some embodiments, separator 720 (as depicted in FIG. 7) can be divided into 6×6 array channels, some of which can connect to different transmitters 900, and some of which can connect to different receivers 1100. In some examples, three transmitters 1210 can transmit light of 850 nm wavelength, three transmitters 1220 can transmit light of 880 nm wavelength, and three transmitters 1230 can transmit light of 940 nm wavelength, each through respective channels of optics path unit 110. In further examples, three channels connecting three receivers 1240 can have a center wavelength of 850 nm, three channels connecting three receivers 1250 can have a center wavelength of 880 nm, three channels connecting three receivers 1260 can have a center wavelength of 940 nm, and all these channels can have a bandwidth of approximately 40 nm and a transmittance over approximately 90%. Eighteen transmitters 1270 can, in some embodiments, transmit light of any suitable wavelength, such as 500 nm-570 nm. In some embodiments, eighteen channels connecting eighteen transmitters 1270 can perform any suitable processing, such as scattering and attenuation. In further embodiments, detection zone 1280 can correspond to three transmitters 1210 and three receivers 1240, detection zone 1285 can correspond to three transmitters 1220 and three receivers 1250, detection zone 1290 can correspond to three transmitters 1230 and three receivers 1260. In another aspect, detection zone 1280, detection zone 1285, and detection zone 1290 can be adjusted by signal processing unit 130.

Figure 13:
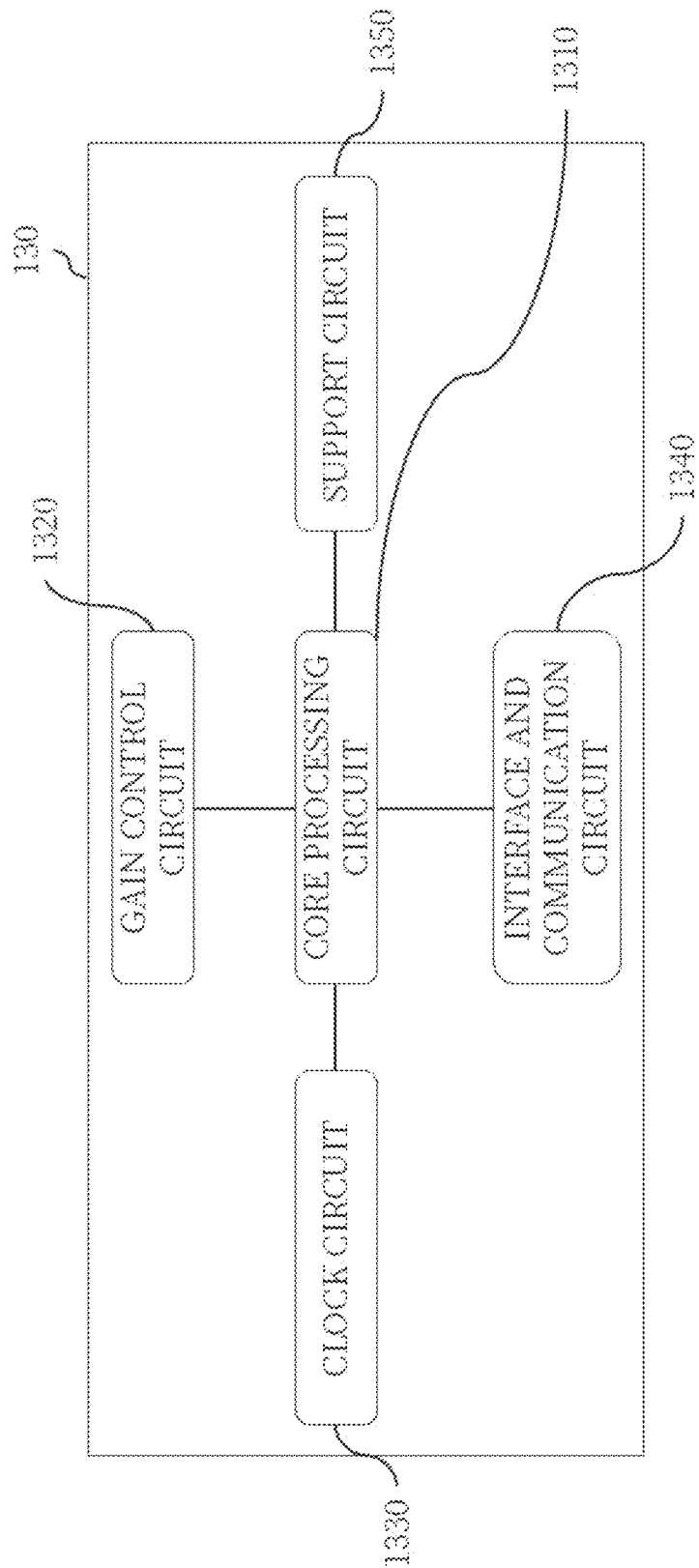
FIG. 13 is an illustration of example hardware components comprising a signal processing unit in accordance with this disclosure.

FIG. 13 depicts a diagram of an illustrative signal processing unit 130. In one embodiment, signal processing unit 130 can comprise a core processing circuit 1310, a gain control circuit 1320, a clock circuit 1330, an interface and communication circuit 1340, and an auxiliary circuit 1350. In some embodiments, core processing circuit 1310 can comprise a digital signal processor (DSP) for performing complex signal analysis and calculation tasks. In some examples, gain control circuit 1320 can adjust the gain of the amplifier, and detect and convert signals. Clock circuit 1330 can, in some embodiments, provide a stable clock signal to maintain the timing and synchronization for signal processing. In some embodiments, interface and communication circuit 1340 can comprise an analog-to-digital converter (ADC), and a communication interface. In further embodiments, auxiliary circuit 1350 can comprise any suitable safety and power supply circuits.

Figure 14:
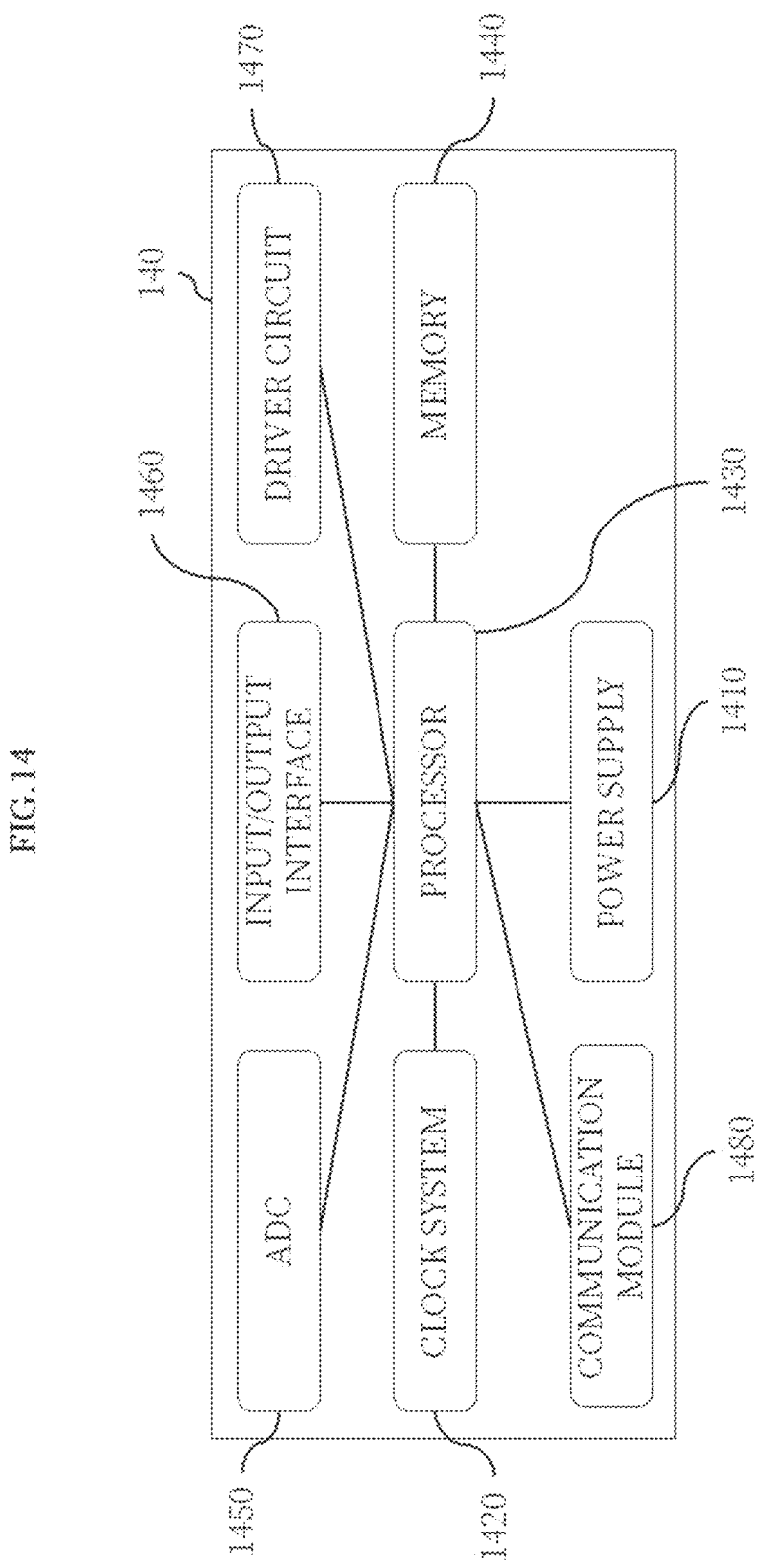
FIG. 14 is an illustration of example hardware components comprising a control unit in accordance with this disclosure.

FIG. 14 depicts a diagram of an illustrative control unit 140. In one embodiment, control unit 140 can comprise a power supply 1410, a clock system 1420, a processor 1430, a memory 1440, an analog-to-digital converter (ADC) 1450, an input/output interface 1460, a driver circuit 1470, and a communication module 1480. In some examples, control unit 140 can comprise any suitable architecture, such as an x86 architecture, an ARM architecture, and a RISC-V architecture. Control unit 140 can, in some embodiments, adopt any suitable circuit design, such as an STM32 board or a PLC board. In some embodiments, power supply 1410 can include power positive/negative/ground pins and a power supply voltage regulator module, providing power for corresponding analog parts, reference voltage, circuits, backup area, and clock parts in control unit 140. In further examples, clock system 1420 can include crystal oscillator pins connecting an external crystal oscillator for providing a high-precision system clock, and an internal clock for providing a timing function for synchronization and timing operations. In another aspect, processor 1430 can comprise one or more CPUs and GPUs. Memory 1440 can include a RAM (random access memory) for temporary data storage and access, and a flash memory for long-term storage of program code and data, in some examples. In further examples, analog-to-digital converter (ADC) 1450 can include sampling, quantization, encoding, and output for converting analog signals into digital signals. In other embodiments, input/output interface 1460 can include one or more relays and/or high-speed counting interfaces. In a further aspect, driver circuit 1470 can include circuits with multiple functions, such as a display screen driver circuit or motor driver circuits. In a still further aspect, communication module 1480 can include interfaces supporting any suitable protocols, such as a serial port interface, a USB interface, a CAN interface, an Ethernet port, or a WLAN interface.

In one embodiment, data unit 150 can include data storage hardware for storing and running a database. In some examples, data unit 150 can include a CPU, a memory, a large-capacity storage device, an input/output device, and an external device.

Figure 15:
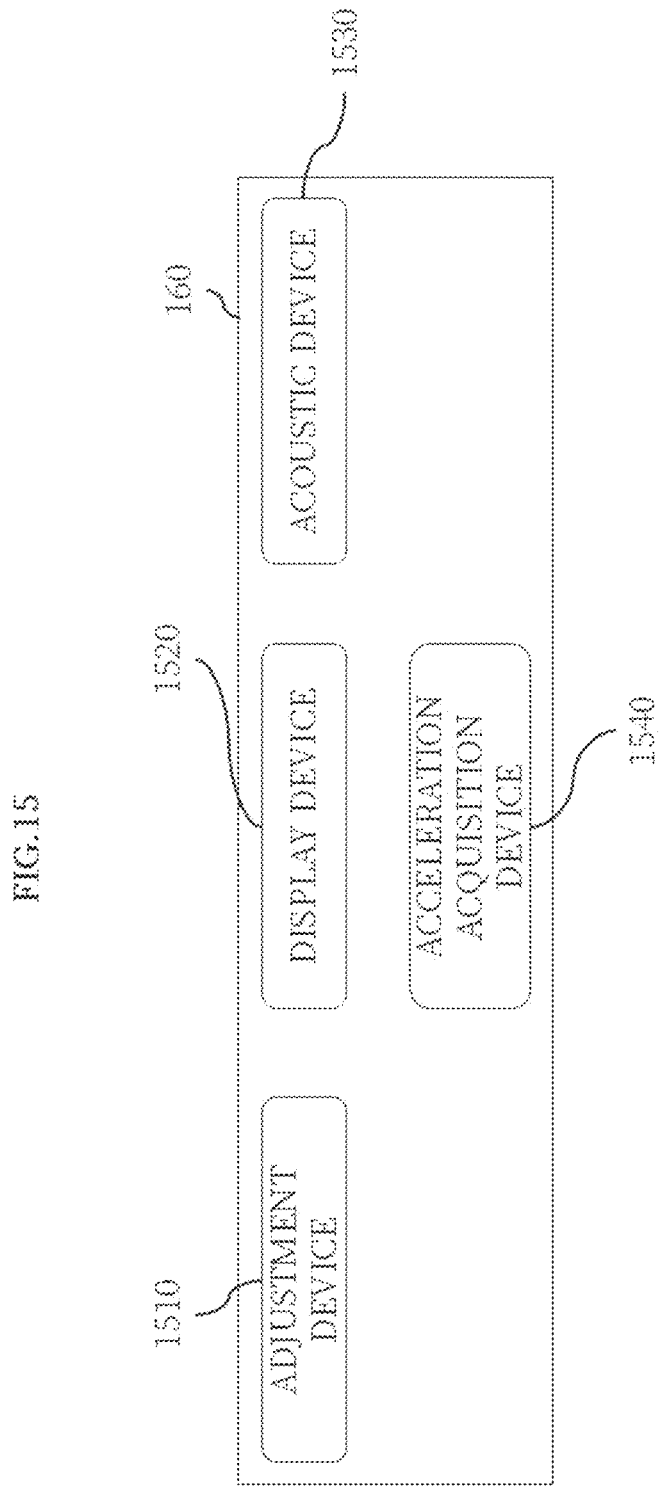
FIG. 15 is an illustration of example hardware components comprising an interaction unit in accordance with this disclosure.

FIG. 15 depicts a diagram of an illustrative interact unit 160. In one embodiment, interact unit 160 can comprise an adjustment device 1510, a display device 1520, an acoustic device 1530, and an acceleration acquisition device 1540. In some examples, adjustment device 1510 can include buttons, switches, and a rheostat, for setting detection modes, wavelength, and effective distance of one or more corresponding detection zones. Display device 1520 can, in some embodiments, include any suitable display device, such as a display screen or display lights. In further embodiments, acoustic device 1530 can include acoustic wave generators and acoustic wave receivers. In another aspect, acceleration acquisition device 1540 can include three mutually perpendicular axial collectors for collecting vibration accelerations associated with impact forces on multi-zone optical detection system 100.

Figure 16:
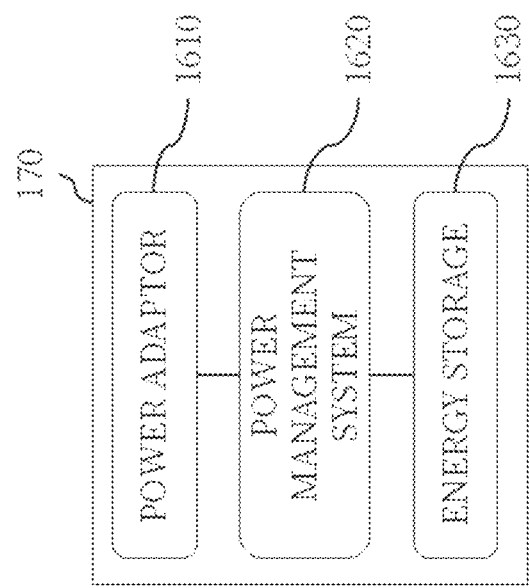
FIG. 16 is an illustration of example hardware components comprising a power supply unit in accordance with this disclosure.

FIG. 16 depicts a diagram of an illustrative power supply unit 170. In some embodiments, power supply unit 170 can include a voltage converting module 1610, a power management module 1620, and an energy storage module 1630. In some examples, voltage converting module 1610 can convert input voltage to different working voltages for the system. Power management module 1620 can, in some embodiments, include a voltage comparator, an undervoltage lockout circuit, a protection circuit, and a temperature control system. In further embodiments, energy storage module 1630 can comprise an energy management system.

Figure 17:
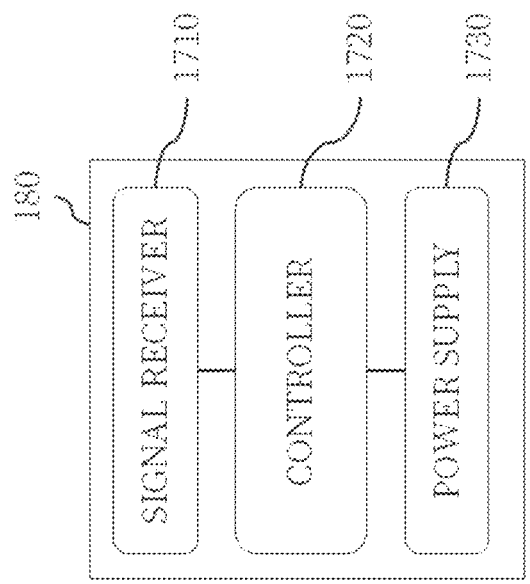
FIG. 17 is an illustration of example hardware components comprising a remote unit in accordance with this disclosure.

FIG. 17 depicts a diagram of an illustrative remote unit 180. In one embodiment, remote unit 180 can include a signal receiver 1710, a control module 1720, and a power module 1730. In some examples, signal receiver 1710 can comprise a wireless receiving circuit and a wired signal receiving circuit. Control module 1720 can, in some embodiments, include a CPU, a memory, input/output interfaces, and relays. In further embodiments, power module 1730 can include a voltage converter and an energy storage device. In one aspect, remote unit 180 can be configured to operate in conjunction with other third-party devices. In some embodiments, remote unit 180 can receive wireless signals from the multi-zone optical detection system 100 via WIFI. In some examples, control module 1720 can include a switch output, an analog output, and a manual control output. In another aspect, power module 1730 can include a voltage converter, for example, to convert 110 VAC-240 VAC power to 24 VDC power.

Figure 18:
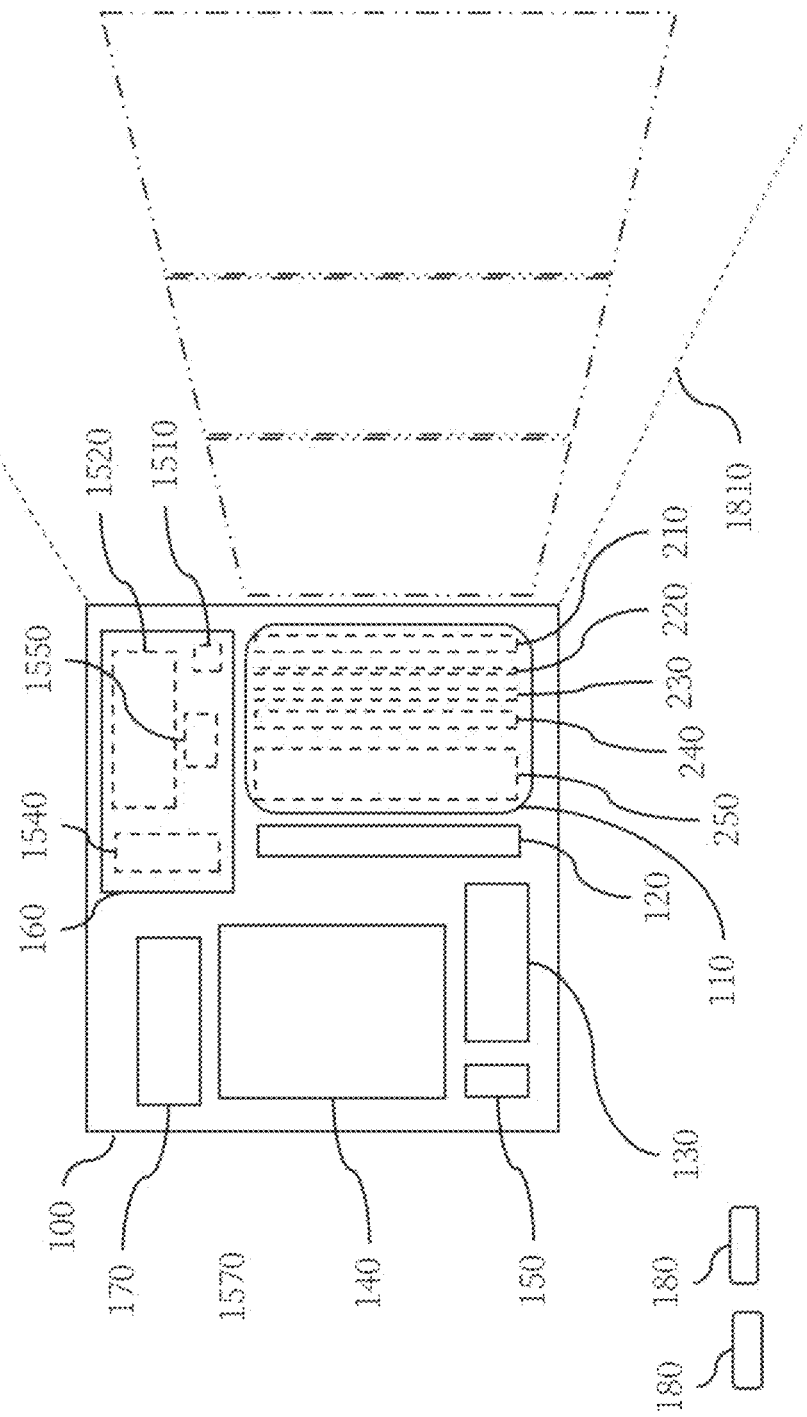
FIG. 18 is an illustration of example components of a multi-zone optical detection system in accordance with this disclosure.

FIG. 18 depicts illustrative components for a multi-zone optical detection system 100, and a target detection region 1810. In some examples, target detection region 1810 may include an acoustic wave coverage region of interact unit 160, a display coverage region of interact unit 160, and a multi-zone detection coverage region. In further examples, optics path unit can comprise a top layer 210, a filter layer 220, a composite layer 230, a gap layer 240, and a bottom layer 250. In other embodiments, interact unit 160 can comprise an adjustment device 1510, a display device 1520, an acoustic device 1530, and an acceleration acquisition device 1540. In further embodiments, multi-zone optical detection system 100 can include one or more remote units 180. In another aspect, one or more remote units 180 can connect to some third-party devices, and/or some remote units 180 can be integrated in some third-party devices.

Figure 19:
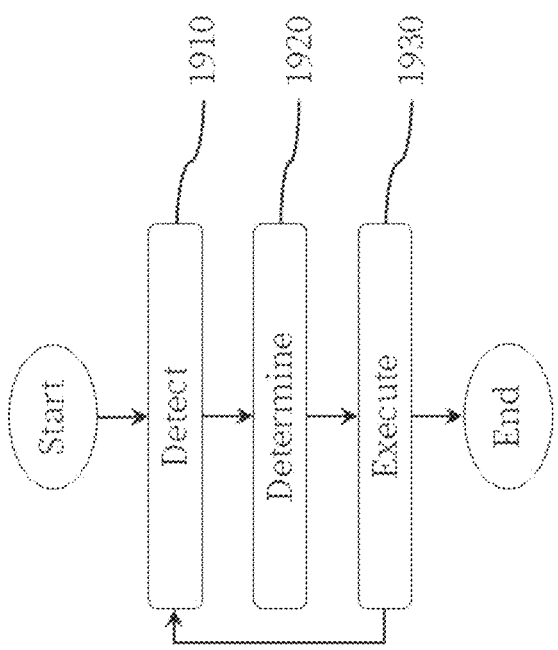
FIG. 19 is a flowchart depicting steps in an example process for managing multi-zone optical detection in accordance with this disclosure.

FIG. 19 depicts a flowchart of an illustrative method for managing multi-zone optical detection system 100. In some embodiments, a detection process can be initiated at step 1910. The management system can interpret the request and make a decision at step 1920. At step 1930, the system can execute one or more actions based on step 1920.

Figure 20:
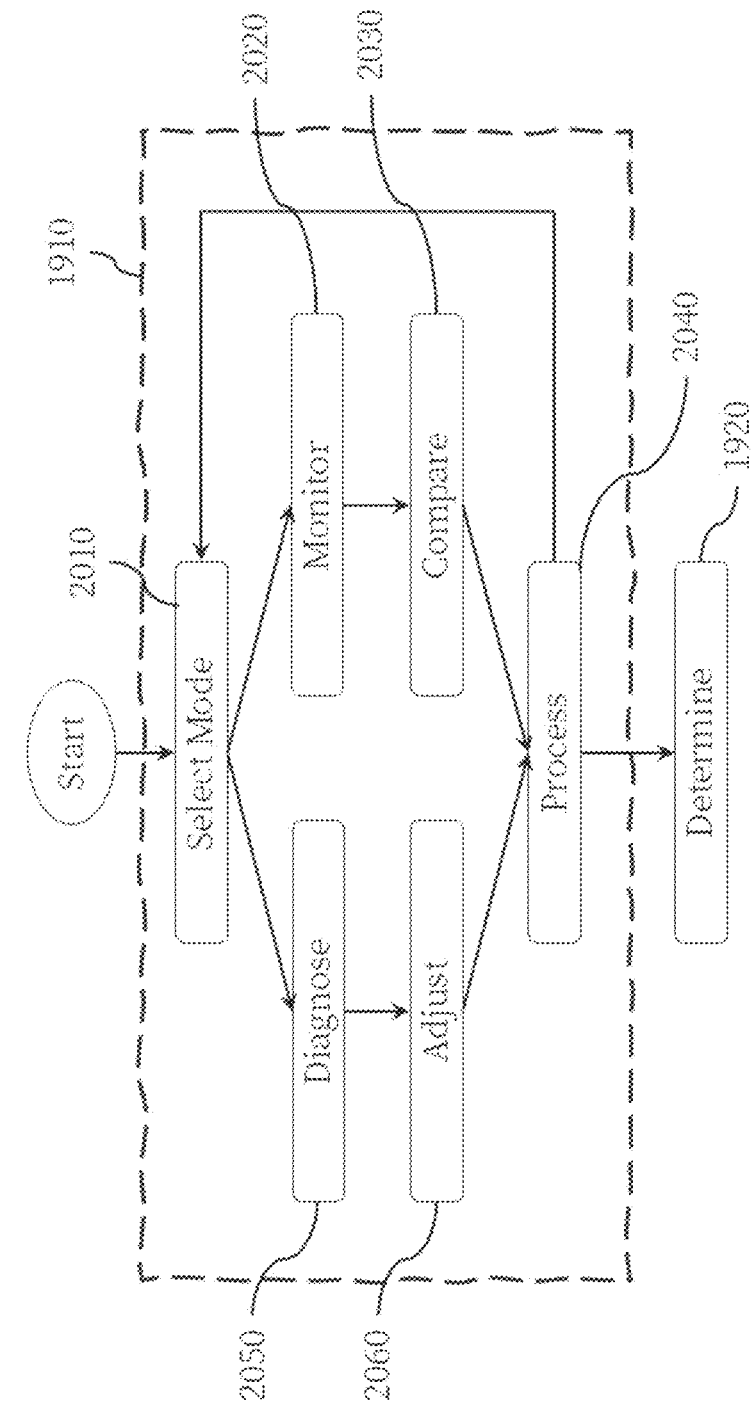
FIG. 20 is a flowchart depicting steps in an example process for managing multi-zone optical detection in accordance with this disclosure.

FIG. 20 depicts a flowchart for describing some embodiments of step 1910 of FIG. 19 in more detail. In some examples, at step 2010, operating modes can be selected according to a preset program logic. At step 2020, the management system can perform monitoring according to a chosen detecting mode. At step 2030, detected information can be compared with an algorithm. At step 2050, diagnosis can be performed. At step 2060, signal process unit 130 can adjust transmitting device 300 based on the diagnosis result from step 2050. At step 2040, information and results from step 2030 and step 2060 can be processed, screening valid detection results and generating reports.

Figure 21:
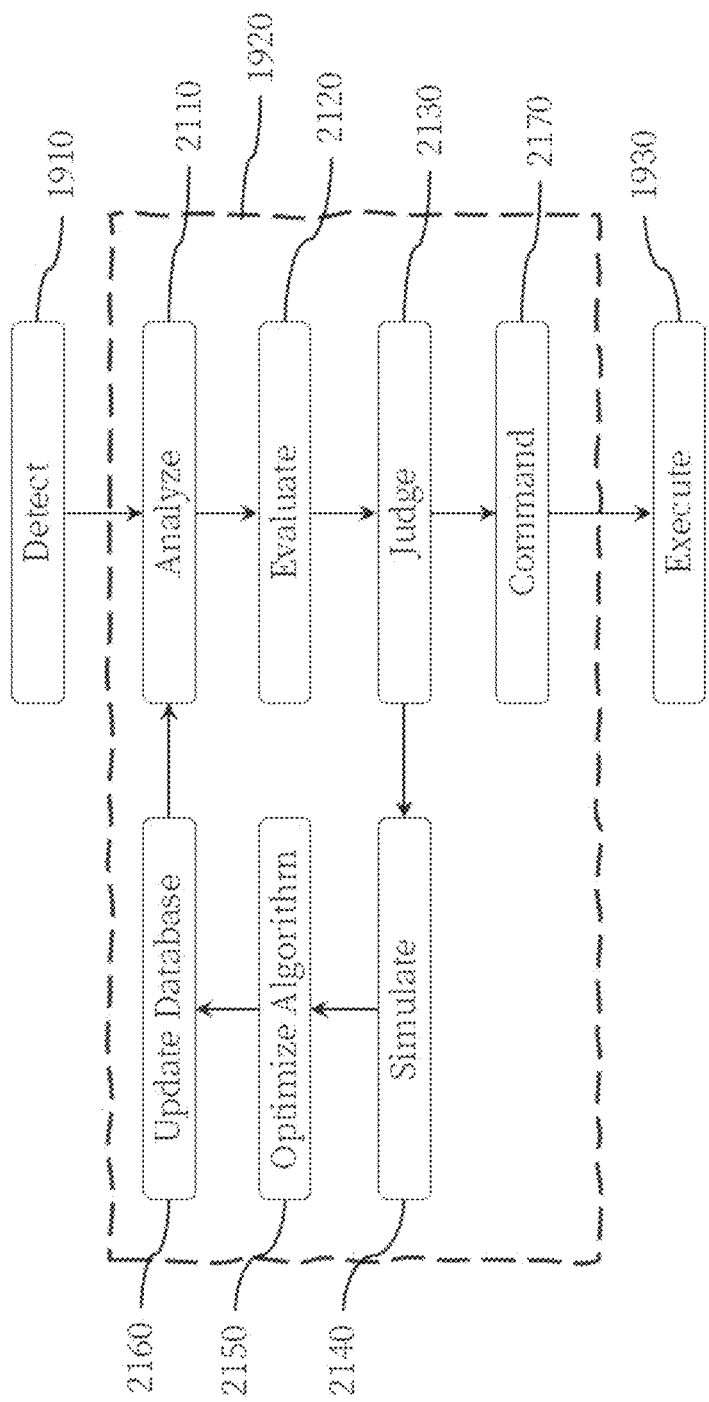
FIG. 21 is a flowchart depicting steps in an example process for managing multi-zone optical detection in accordance with this disclosure.

FIG. 21 depicts a flowchart for describing some embodiments of step 1920 of FIG. 19 in more detail. In some examples, at step 2110, algorithms and parameters in database unit 150 can be synchronized for analyzing detection results. At step 2120, features and key information can be extracted and evaluated. At step 2130, the data can be converted into high-level logic to help make management decisions. At step 2140, simulation comparison may be performed using real data to evaluate the current algorithm. At step 2150, the algorithm and model can be optimized through deviation and trend analysis over a long time domain. At step 2160, algorithms and parameters can be saved and updated. At step 2170, control unit 140 can instruct control signals to corresponding circuits.

Figure 22:
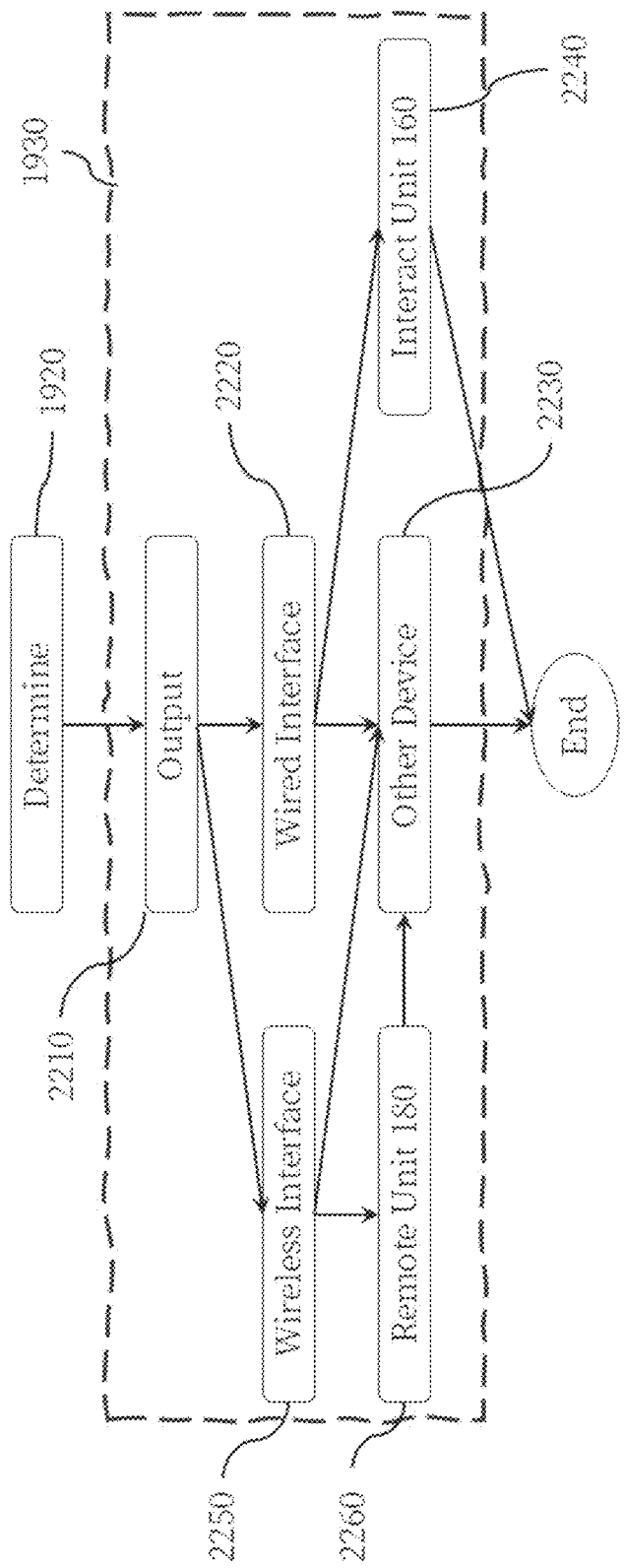
FIG. 22 is a flowchart depicting steps in an example process for managing multi-zone optical detection in accordance with this disclosure.

FIG. 22 depicts a flowchart for describing some embodiments of step 1930 of FIG. 19 in more detail. In some examples, output can be generated at step 2210. At step 2220, output signals can be delivered through wired interface. At step 2230, other devices can receive output signals via a wired connection or a wireless connection. At step 2240, output signals can be transmitted to interact unit 160 via a wired connection, such as to display device 1520 via a serial communication or a high voltage signal through respective input pins. At step 2250, output signals can be delivered through wireless interface using any suitable communication protocol, such as WIFI, Bluetooth, and Zigbee. At step 2260, output signals can be transmitted to remote unit 180 via a wireless connection. In some examples, remote unit 180 can be integrated to other devices.

Figure 23:
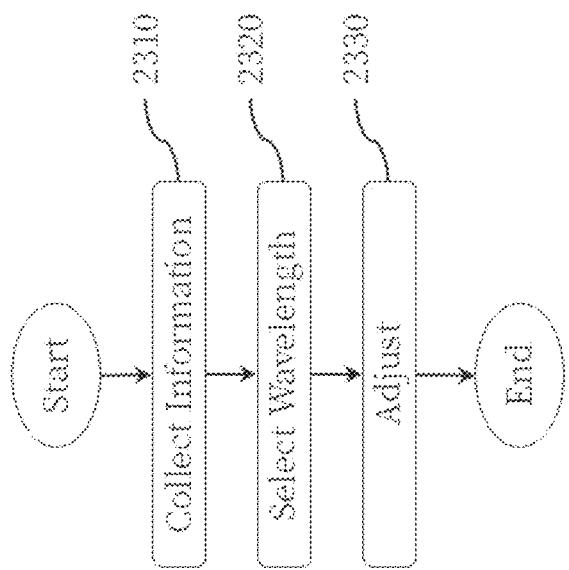
FIG. 23 is a flowchart depicting steps in an example process for managing multi-zone optical detection in accordance with this disclosure.

FIG. 23 depicts a flowchart for describing some embodiments of step 2050 of FIG. 20 in more detail. In one embodiment, at step 2310, transmit device 800 can stop working, and receive device 1000 can monitor ambient light of different wavelengths, such as recording intensity patterns of different wavelength with respect to time and direction. At step 2320, one or more suitable wavelengths can be selected to cover a respective target detection zone. At step 2330, the management system can adjust wavelength and covering distance of respective transmitter 900 of transmit device 800. For example, a multi-zone optical detection system 100 can include two detection zones, which face a continuous ambient noise light of 880 nm wavelength in the morning, and 940 nm wavelength in the afternoon. With collected information, 850 nm wavelength can be enabled for a detection zone covering 1 cm-10 cm distance, 940 nm wavelength can be selected for a detection zone covering 1 cm-5 cm distance in the morning, and 880 nm wavelength can be selected for the detection zone covering 1 cm-5 cm distance in the afternoon. In further examples, covering distance of respective detection zone can be adjusted by signal process unit 130.

Figure 24:
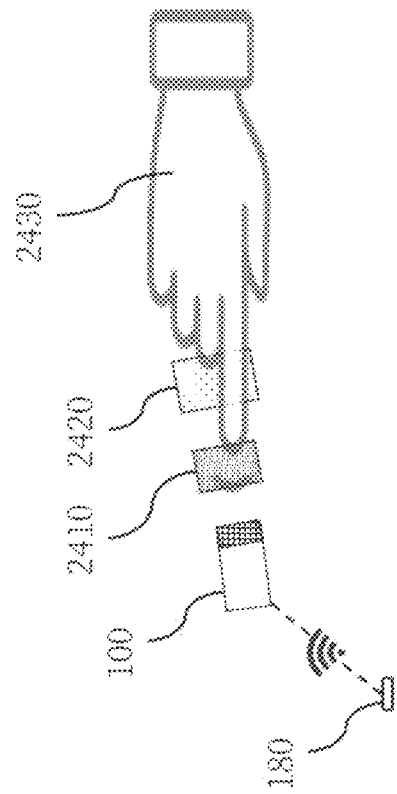
FIG. 24 is an illustration of example components of a multi zone optical detection system in accordance with this disclosure.

FIG. 24 depicts an example of a control method of a multi-zone optical detection system. In one aspect, a multi-zone optical detection system 100 can include a detection zone 2410 covering 1 cm-5 cm distance, a detection zone 2410 covering 1 cm-10 cm distance, a remote unit 180, and a hand 2430. Coverage distance and wavelength of respective detection zone 2410 and detection zone 2420 can be adjusted as described in FIG. 23. Multi-zone optical detection system 100 can include an acceleration acquisition device 1570 to detect acceleration in X-axis, Y-axis, and Z-axis directions. For example, when the absolute acceleration value in Z-axis is greater than the absolute acceleration value in both X-axis and Y-axis, a [tap] action can be detected by the multi-zone optical detection system. As hand 2430 air clicks, detection zone 2420 and detection 2410 can be triggered in sequence. In further examples, hand 2430 can tap on the multi-zone after air click through detection zone 2420 and detection zone 2410 in sequence.

Figure 25:
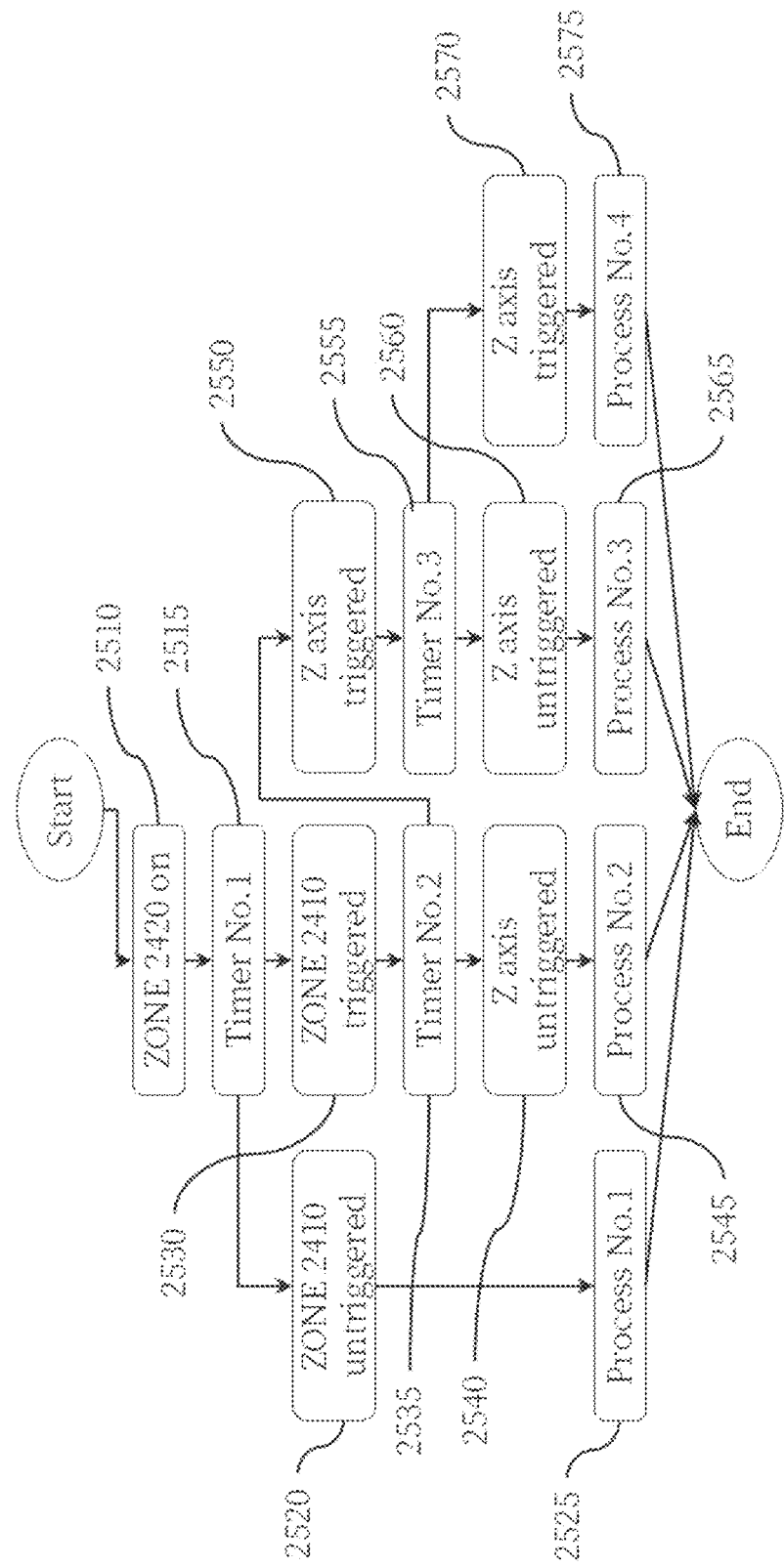
FIG. 25 is a flowchart depicting steps in an example process for managing multi-zone optical detection in accordance with this disclosure.

FIG. 25 depicts a flowchart of an illustrative method for managing multi-zone optical detection system 100 of FIG. 24. In one embodiment, at step 2510, detection zone 2420 can cover a detection distance of 1 cm-12 cm, which can be used to indicate a triggering is detected. At step 2515, a timer 1 can start timing. At step 2520, in some examples, during the cycle of timer 1, detection zone 2410 is not triggered. At step 2525, according to a program setting, control unit 140 can send command signals according to process No. 1, such as displaying green light from respective transmitters 900 of transmit device 800. At step 2530, during the cycle of timer 1, detection zone 2410 can be triggered. At step 2535, timer 2 can start timing. At step 2540, during the cycle of timer 2, acceleration acquisition device 1570 can detect a [tap] as described in FIG. 24. At step 2545, according to program setting, control unit 140 can send command signals according to process No. 2, such as turning off green light from respective transmitters 900 of transmit device 800, displaying blue light from respective transmitters 900 of transmit device 800, and maintaining a relay on for 3 s followed by off. At step 2550, during the cycle of timer 2, acceleration acquisition device 1570 can detect a [tap]. At step 2555, timer 3 can start timing. At step 2560, in some examples, acceleration acquisition device 1570 did not detect a [tap] within the cycle of timer 3. At step 2565, according to program setting, control unit 140 can send command signal according to process No. 3, such as turning on remote unit 180 through WIFI communication. At step 2570, within the cycle of timer 3, acceleration acquisition device 1570 can detect a [tap]. At step 2575, according to program setting, control unit 140 can send command signal according to process No. 4, such as displaying a video through display device 1520 of interact unit 160, and playing a voice recording through acoustic device 1530 of interact unit 160.

Figure 26:
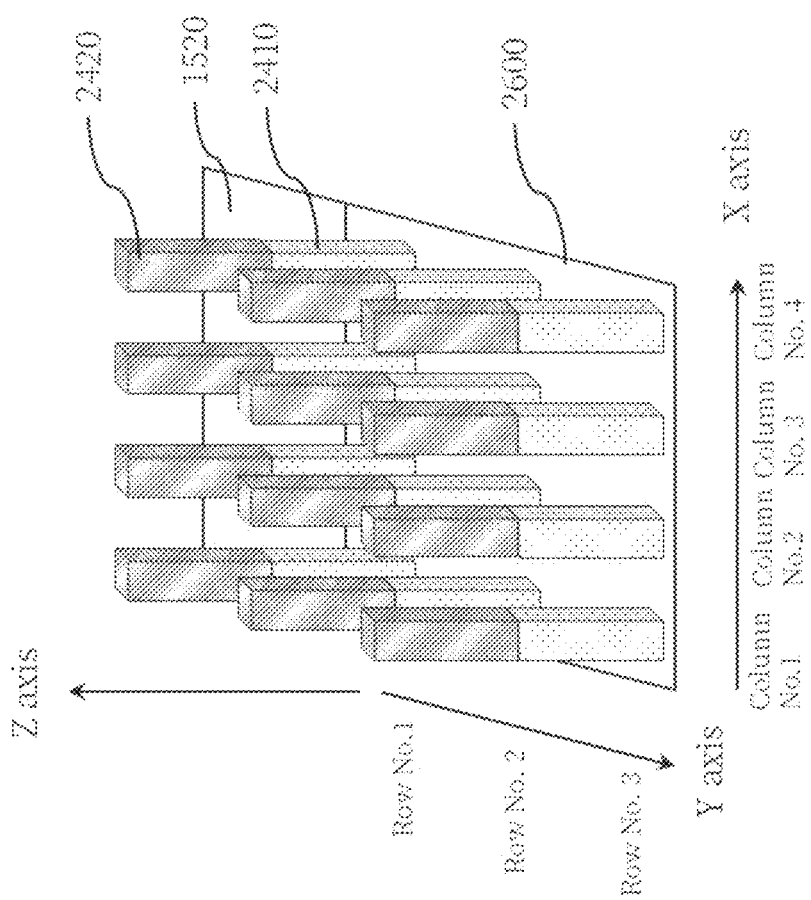
FIG. 26 is an illustration of example components of a group of multi-zone optical detection systems in accordance with this disclosure.

FIG. 26 depicts an example of a group of multi-zone optical detection systems 2600. In one aspect, twelve multi-zone optical detection systems 100 can be arrayed in four columns along the X axis and in three rows along the Y axis, with respective detection zones 2410 covering 1 cm (X axis)×1 cm (Y axis)×5 cm (Z axis), and detection zones 2420 covering 1 cm (X axis)×1 cm (Y axis)×10 cm (Z axis). Some units included in each multi-zone optical detection system 100 can be fused into a corresponding unit of the same type. For example, the group of multi-zone optical detection systems 2600 can comprise twelve optics path units 110, twelve photoelectric units 120, twelve signal processing units 130, one control unit 140, one database unit 150, one interaction unit 160, one power supply unit 170, and any suitable number of remote units 180. In further examples, the group of multi-zone optical detection systems 2600 can comprise twelve independent multi zone optical detection systems 100.

Figure 27:
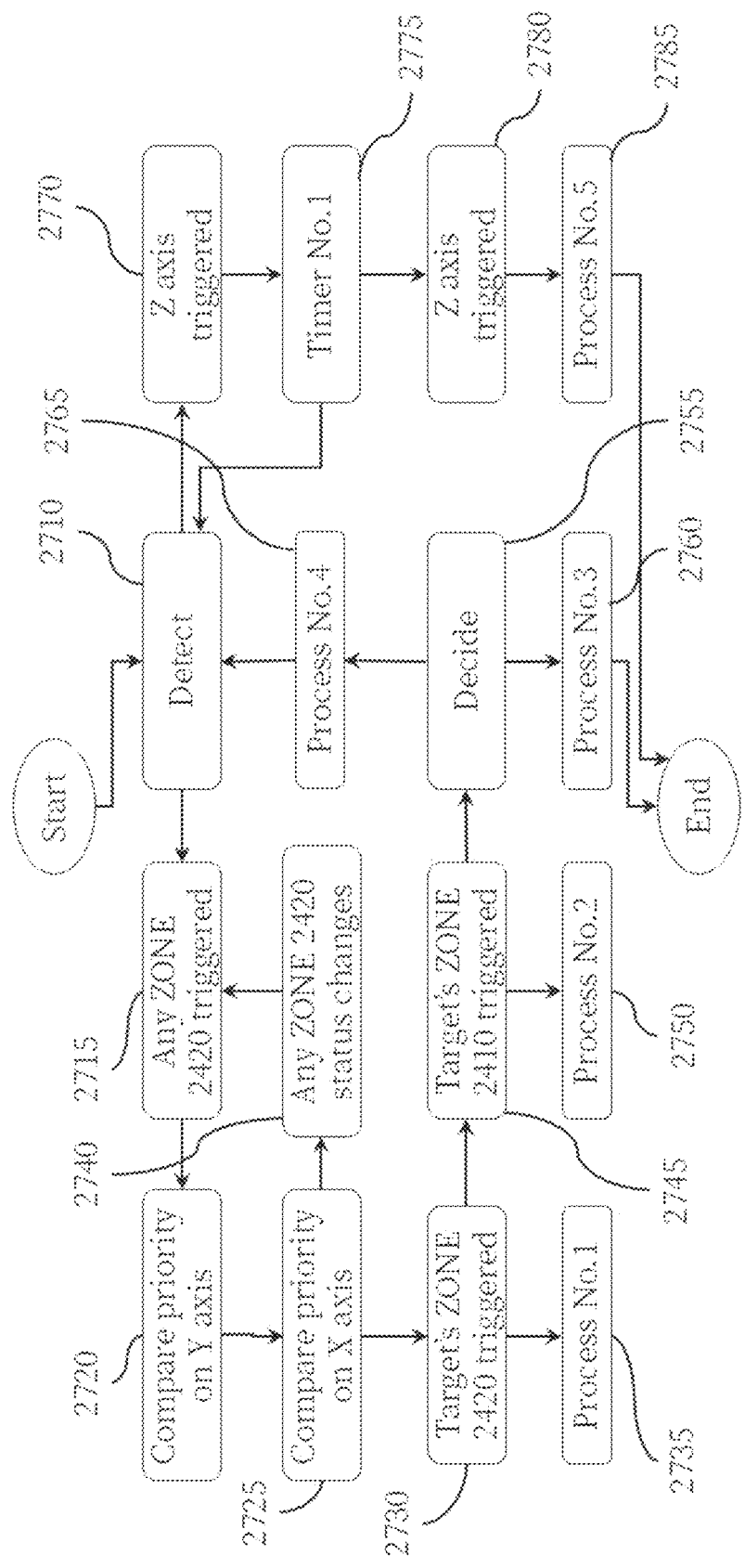
FIG. 27 is a flowchart depicting steps in an example process for managing a group of multi-zone optical detection systems in accordance with this disclosure.

FIG. 27 depicts a flowchart of an illustrative method for managing a group of multi-zone optical detection systems 2600 of FIG. 24. In one embodiment, at step 2710, the group of multi-zone optical detection systems 2600 can keep detecting. At step 2715, any detection zone 2420 can be triggered, but no detection zone 2410 can be triggered. At step 2720, every multi-zone optical detection system 100 with detection zone 2420 triggered in the row of highest priority on Y axis can be selected. At step 2725, one multi-zone optical detection system 100 with detection zone 2420 triggered of highest priority on X axis can be selected as target. At step 2730, detection zone 2420 of the target can keep triggering, but detection zone 2410 cant not be triggered. At step 2735, the group of multi-zone optical detection systems 2600 can execute process No. 1. At step 2740, any triggered detection zone 2420 can stop triggering, or new detection zone 2420 can be triggered. At step 2745, it can be detected that the target triggers ZONE 2410. At step 2750, the group of multi-zone optical detection systems 2600 can execute process No. 2. At step 2755, each time a target triggers its zone 2410, the group of multi-zone optical detection systems 2600 can determine whether to enable step 2760 only, step 2710 only, or both. At step 2760, the group of multi-zone optical detection systems 2600 can execute process No. 3. At step 2765, the combined systems 2600 can execute process No. 4. At step 2770, an acceleration acquisition device 1540 can detect a [tap]. At step 2775, timer No. 1 can start timing, and the process can go back to step 2710 in case a second [tap] action is not detected until timer No. 1 ends. At step 2780, before timer No. 1 ends, a second [tap] action can be detected by acceleration acquisition device 1540. At step 2785, the group of multi-zone optical detection systems 2600 can execute process No. 4.

Figure 28:
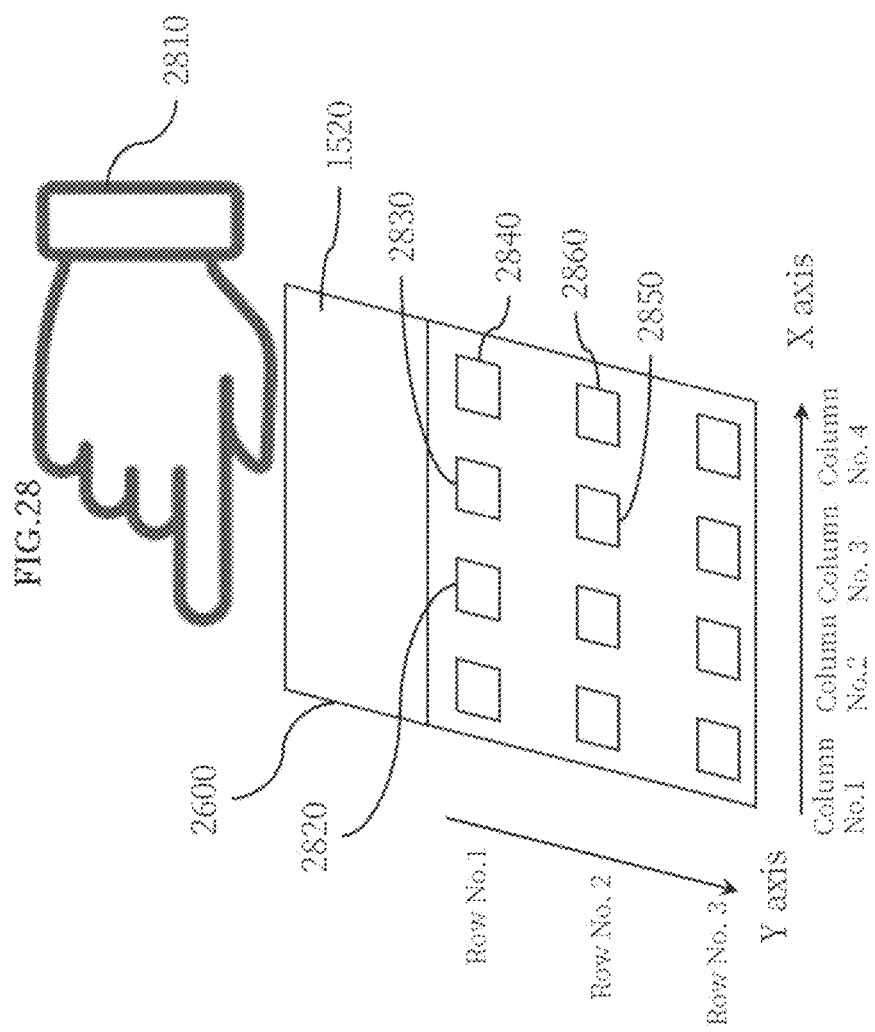
FIG. 28 is an illustration of example components of a group of multi-zone optical detection systems in accordance with this disclosure.

FIG. 28 depicts a flowchart for describing some embodiments of step 2715 of FIG. 27 in more detail. In one embodiment, multi-zone optical detection system 2820, multi-zone optical detection system 2830, multi-zone optical detection system 2840, multi-zone optical detection system 2850, and multi-zone optical detection system 2860 can detect a hand 2810 triggering a respective detection zone 2420. Display device 1520 can display previous information on a screen.

Figure 29:
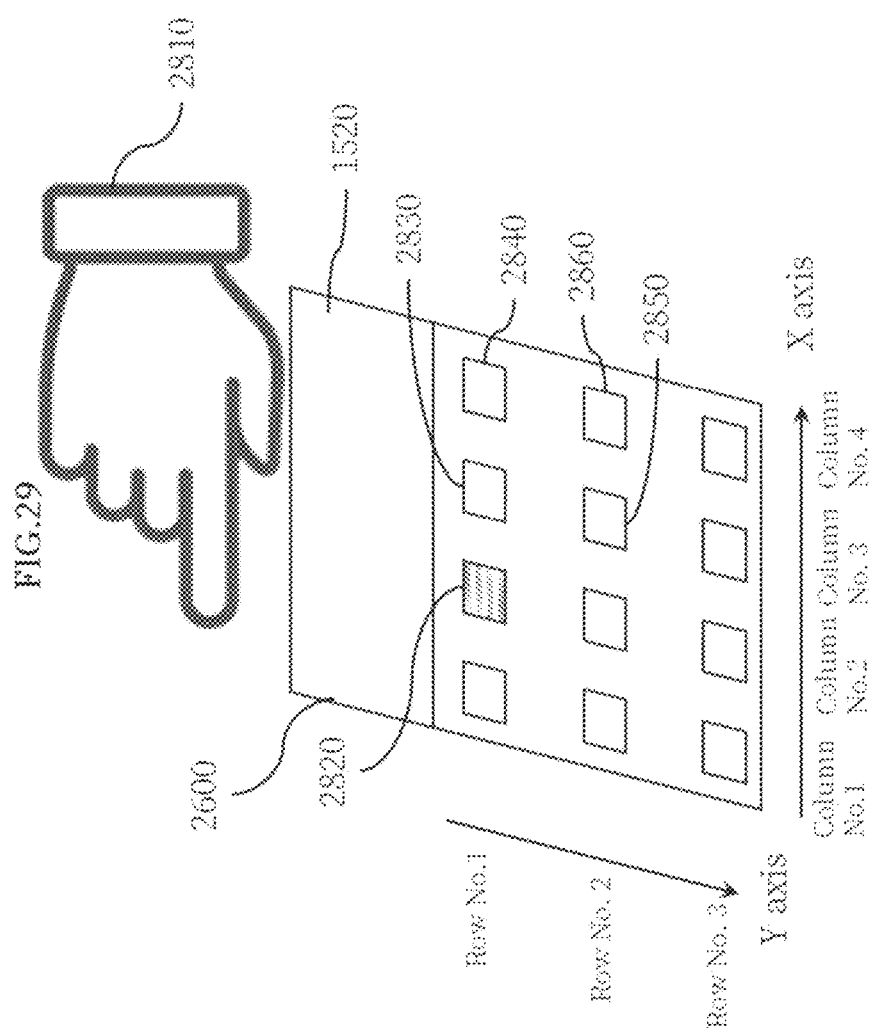
FIG. 29 is an illustration of example components of a group of multi-zone optical detection systems in accordance with this disclosure.

FIG. 29 depicts a flowchart for describing some embodiments of step 2735 of FIG. 27 in more detail. In one embodiment, at step 2720, row No. 1 can have higher priority than row No. 2. Therefore, multi-zone optical detection system 2820, multi-zone optical detection system 2830, and multi-zone optical detection system 2840 can be selected. For example, at step 2725, column No. 2 can have higher priority than column No. 3 and column No. 4. Multi-zone optical detection system 2820 can be selected as a target. At step 2730, the target's detection zone 2420 can keep triggering. At step 2735, some transmitters 900 of transmit device 800 of multi-zone optical detection system 2820 can transmit green light indicating being selected as target. At this time, display device 1520 can still display previous information on screen.

Figure 30:
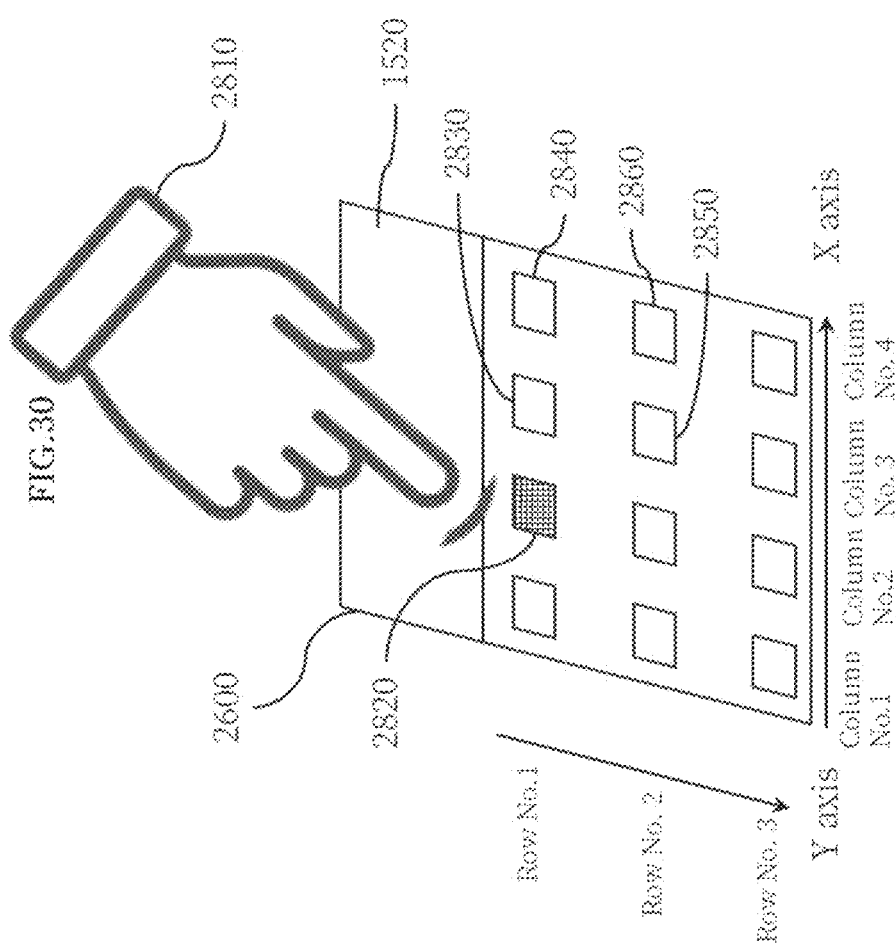
FIG. 30 is an illustration of example components of a group of multi-zone optical detection systems in accordance with this disclosure.

FIG. 30 depicts a flowchart for describing some embodiments of step 2760 of FIG. 27 in more detail. In one embodiment, hand 2810 can air click toward multi-zone optical detection system 2820. At step 2745, multi-zone optical detection system 2820 can detect a trigger of detection zone 2410. At step 2750, transmit device 800 of multi-zone optical detection system 2820 can stop emitting green light, and some transmitters 900 can keep emitting blue light for approximately two seconds, indicating an air-clicked motion detected. At step 2755, a group of multi-zone optical detection systems 2600 can determine whether to proceed to step 2760 or step 2765. For example, if each multi-zone optical detection system represents a number/letter/symbol, and a password needs to end at symbol "#", step 2755 can decide to proceed to step 2760 upon symbol "#" being air-clicked, otherwise proceed to step 2765. At step 2760, display device 1520 can display any appropriate corresponding operation prompt. At step 2765, display device 1520 can display the number/letter/symbol represented by the target. For a password display, display device 1520 can display the current symbol following some previously displayed symbols. In further examples, the group of multi-zone optical detection systems 2600 can continue to enter step 2710 after detecting no detection zone 2420 being triggered.

Figure 31:
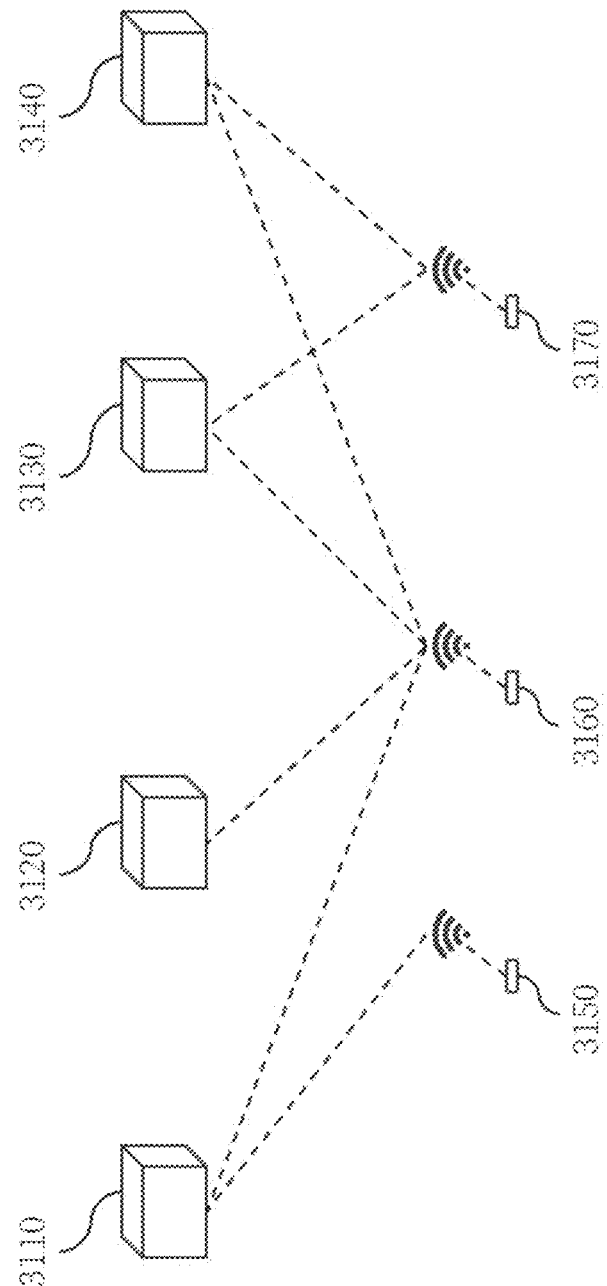
FIG. 31 is an illustration of example components of groups of multi-zone optical detection systems in accordance with this disclosure.

FIG. 31 depicts an example of a group of multi-zone optical detection systems 3110, a group of multi-zone optical detection systems 3120, a group of multi-zone optical detection systems 3130, a group of multi-zone optical detection systems 3140, a remote unit 3150, a remote unit 3160, and a remote unit 3170. In one aspect, the group of multi-zone optical detection systems 3110, the group of multi-zone optical detection systems 3120, the group of multi-zone optical detection systems 3130, and the group of multi-zone optical detection systems 3140 can be positioned at different locations, and communicate through LAN, WLAN, or another suitable communication protocol. In some examples, remote unit 3150, remote unit 3160, and remote unit 3170 can be positioned at different locations. In one example, remote unit 3150 can communicate with and be controlled by the group of multi-zone optical detection systems 3110. In another example, remote unit 3160 can communicate with and be controlled by the group of multi-zone optical detection systems 3110, the group of multi-zone optical detection systems 3120, the group of multi-zone optical detection systems 3130, and the group of multi-zone optical detection systems 3140. In a further example, remote unit 3170 can communicate with and be controlled by the group of multi-zone optical detection systems 3130, and the group of multi-zone optical detection systems 3140.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, in a different order, or a different timeframe. The order of steps presented is only illustrative of the possibilities and those steps can be executed or performed in any suitable fashion. Moreover, the various features of the examples described here are not mutually exclusive. Rather, any feature of any example described here can be incorporated into any other suitable example. It is intended that the specification and examples be considered as illustrative only, with a true scope and spirit of the disclosure being indicated by the following claims.

What is claimed is:

1. A network comprising a plurality of optical detection systems in communication with each other, each optical detection system comprising:
    a plurality of physical layers, including a top layer, a filter layer, a composite layer, and a bottom layer, the bottom layer comprising a separator optically isolating a plurality of optical transmitters and a plurality of optical receivers;
    a first detection zone associated with a first subset of the plurality of optical transmitters and a first subset of the plurality of optical receivers; and
    a second detection zone associated with a second subset of the plurality of optical transmitters and a second subset of the plurality of optical receivers,
    wherein each respective optical detection system determines at least one of motion, acceleration, or speed of an object moving from the first detection zone to the second detection zone, and
    wherein a first optical detection system has a higher priority than a second optical detection system, such that when movement associated with the first and second optical detection systems is detected, a first command that is associated with the first optical detection system is performed and a second command that is associated with the second optical detection system is not performed.

2. The network of claim 1, wherein the filter layer comprises an array of filter lenses, each filter lens within the array corresponding to one of the optical transmitters or one of the optical receivers.

3. The network of claim 1, further comprising a processing unit configured to differentiate between movement detected in the first and second detection zones of a first optical detection system from movement detected in the first and second detection zones of a second optical detection system.

4. The network of claim 1, wherein the first subset of optical transmitters transmit light at a first wavelength and the second subset of optical transmitters transmit light at a second wavelength.

5. The network of claim 1, wherein the first detection zone is located in a first three-dimensional space and the second detection zone is located in a second three-dimensional space.

6. The network of claim 1, wherein the first subset of the plurality of optical transmitters is configured to transmit light of a first wavelength for a first period of time and configured to transmit light of a second wavelength for a second period of time following the first period of time.

7. A method for performing multi-zone optical detection, comprising:
    providing a plurality of optical detection systems, each optical detection system including a plurality of optical transmitters, a plurality of optical receivers, a first detection zone, and a second detection zone;
    each of the plurality of optical detection systems configured to:
        transmit a first wavelength of light by a first subset of the plurality of optical transmitters;
        detect, in the first detection zone, reflections of light associated with the first subset of the plurality of optical transmitters using a first subset of the plurality of optical receivers;
        transmit a second wavelength of light by a second subset of the plurality of optical transmitters;
        detect, in the second detection zone, reflections of light associated with the second subset of the plurality of optical transmitters using a second subset of the plurality of optical receivers; and
        determine a movement, acceleration, or speed associated with an object moving through the first and second detection zones,
        wherein a first optical detection system has a higher priority than a second optical detection system, such that when the first and second optical detection systems determine the movement, acceleration, or speed associated with the object, a first command associated with the first optical detection system is performed and a second command associated with the second optical detection system is not performed.

8. The method of claim 7, further comprising:
    differentiating between movement detected in the first and second detection zones of the first optical detection system from movement detected in the first and second detection zones of the second optical detection system.

9. The method of claim 7, further including:
    positioning each of the optical detection systems at a different physical location.

10. The method of claim 7, wherein the first detection zone is located in a first three-dimensional space and the second detection zone is located in a second three-dimensional space.

11. The method of claim 10, wherein at least a portion of the first detection zone and at least a portion of the second detection zone overlap one another.

12. An optical detection system, comprising:
    a plurality of physical layers, including a top layer, a filter layer, a composite layer, and a bottom layer, the bottom layer comprising a separator optically isolating a plurality of optical transmitters and a plurality of optical receivers;
    a first detection zone associated with a first subset of the plurality of optical transmitters and a first subset of the plurality of optical receivers;
    a second detection zone associated with a second subset of the plurality of optical transmitters and a second subset of the plurality of optical receivers; and a processor for determining at least one of motion, acceleration, or speed of an object moving from the first detection zone to the second detection zone, wherein the optical detection system has a higher priority than a second optical detection system, such that when the optical detection system and the second optical detection system determine the at least one of motion, acceleration, or speed of the object, a first command associated with the optical detection system is performed and a second command associated with the second optical detection system is not performed.

13. The system of claim 12, wherein the first subset of the plurality of optical transmitters transmits light in a first wavelength and the second subset of the plurality of optical transmitters transmits light in a second wavelength.

14. The system of claim 12, wherein the first detection zone is located in a first three-dimensional space and the second detection zone is located in a second three-dimensional space.

15. The system of claim 12, wherein the first subset of the plurality of optical transmitters is configured to transmit light of a first wavelength for a first period of time and configured to transmit light of a second wavelength for a second period of time following the first period of time.

16. The system of claim 12, wherein:

the separator comprises an array of optically isolated cells; and each of the plurality of optical transmitters and optical receivers is positioned within a respective cell of the array.

17. The system of claim 12, wherein the first subset of the plurality of optical receivers is configured to detect light transmitted by the first subset of optical transmitters and is configured not to detect light transmitted by the second subset of optical transmitters.

* * * * *